United States Patent
Matsushima et al.

(10) Patent No.: US 6,292,609 B1
(45) Date of Patent: Sep. 18, 2001

(54) OPTICAL COMPONENTS INCLUDING AN OPTICAL ELEMENT HAVING A SURFACE THAT IS TAPERED

(75) Inventors: Toshiyuki Matsushima, Nara; Yorishige Ishii, Yamatotakada; Kuniaki Okada, Tenri; Hideaki Fujita, Shiki-gun; Yukio Kurata, Tenri; Toshihiro Tamura, Shiki-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/420,022

(22) Filed: Oct. 18, 1999

(30) Foreign Application Priority Data

Oct. 20, 1998 (JP) .................................................. 10-298849

(51) Int. Cl.[7] .............................. G02B 6/00; G02B 6/34
(52) U.S. Cl. ............................................................. 385/43
(58) Field of Search .............................. 385/40–43, 147; 264/1.27; 359/326; 361/112

(56) References Cited

U.S. PATENT DOCUMENTS

| | | | | |
|---|---|---|---|---|
| 5,462,700 | * | 10/1995 | Beeson et al. | 264/1.27 |
| 5,726,962 | * | 3/1998 | Okada et al. | 367/112 |
| 6,002,515 | * | 12/1999 | Mizuuchi et al. | 359/326 |

FOREIGN PATENT DOCUMENTS

| | | | |
|---|---|---|---|
| 4-330404 | * | 11/1982 | (JP) . |
| 4-330404 | | 11/1992 | (JP) . |
| 7-135142 | * | 5/1995 | (JP) . |
| 8-155667 | * | 6/1996 | (JP) . |
| 8-241889 | | 9/1996 | (JP) . |
| 8-318386 | | 12/1996 | (JP) . |

OTHER PUBLICATIONS

:Low loss Polymeric Optical Waveguides with 45 Mirrors by Yoshimura et al.,Moc/Grin Tokyo p. 2, pp 390–393, Jan. 1997.*

"A Novel Polyimide Film Preparation and Its Preferential–Like Chemical Etching Techniques for GaAs Devices", Y. Harada, et al., J. Electrochem. Soc., vol. 130, No. 1, Jan. 1983, pp. 129–134.

"Low–Loss Polymeric Optical Waveguides with 45°Mirrors", R. Yoshimura, et al., Moc/Grin '97 Tokyo p. 2, pp. 390–393.

* cited by examiner

Primary Examiner—Akm E. Ullah
(74) Attorney, Agent, or Firm—David G. Conlin; William J. Daley, Jr.; Dike, Bronstein, Roberts and Cushman

(57) ABSTRACT

There is featured a processing method for processing a target body that includes setting a beam area formed by a laser beam on the organic insulating film so as to be larger than an area formed by projecting a target part of an organic insulating film onto a horizontal plane. The method also includes, subsequently moving the organic insulating film toward the irradiated region of the laser beam, and terminating the irradiation with the laser beam when the end part of the target part coincides with the moving end part of the laser beam. This enables the resultant processed target surface to be smooth and free from reaction product including decomposed segments of the target body. Also featured is an optical component including an optical element having a surface that is processed according to the processing methods of the present invention.

6 Claims, 12 Drawing Sheets

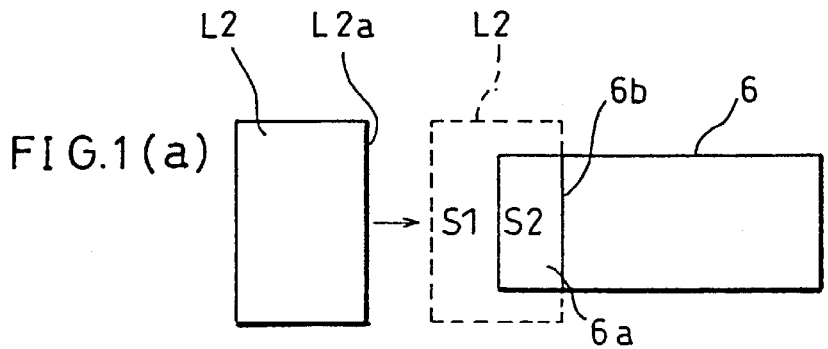
FIG.1(a)
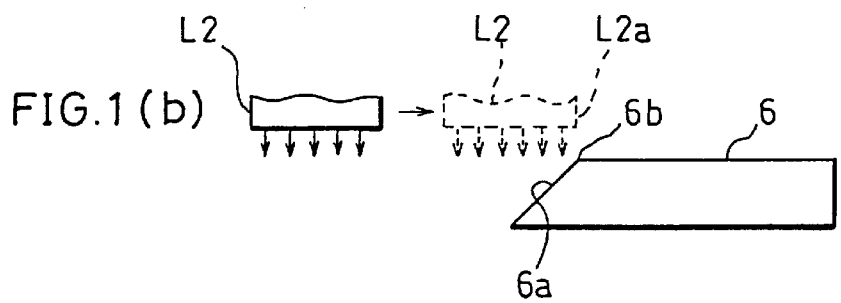
FIG.1(b)
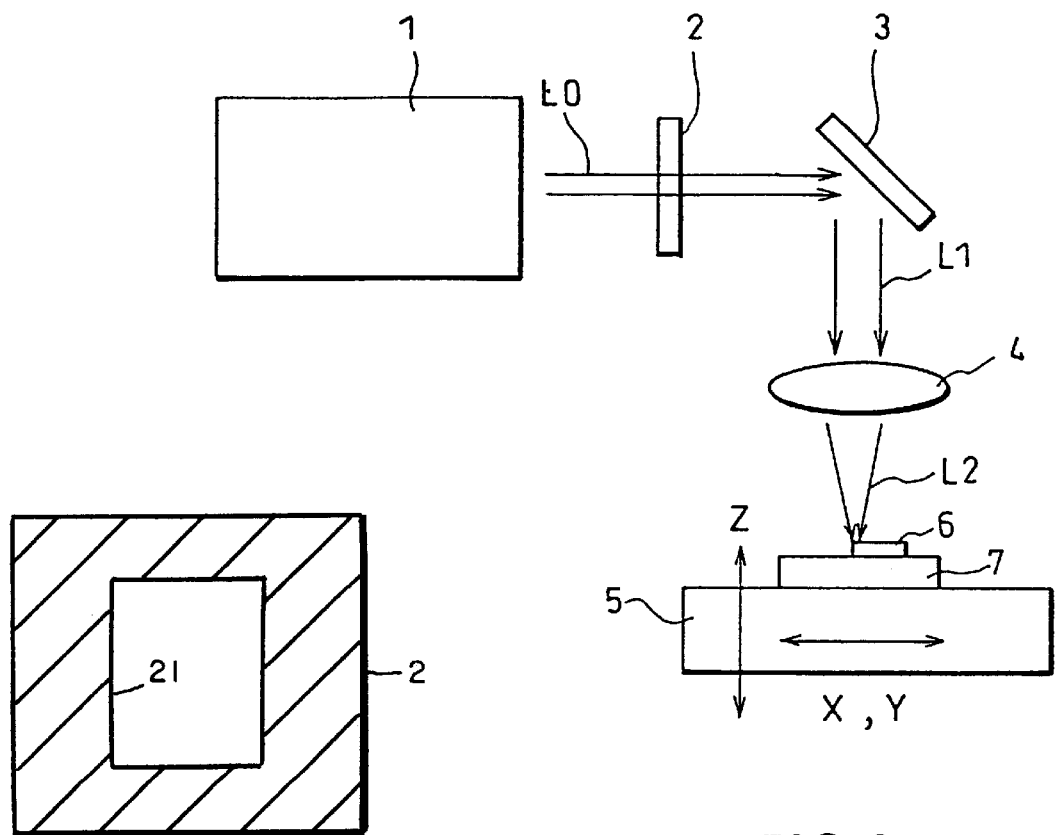
FIG.2
FIG.3

FIG.4(a)
FIG.4(b)
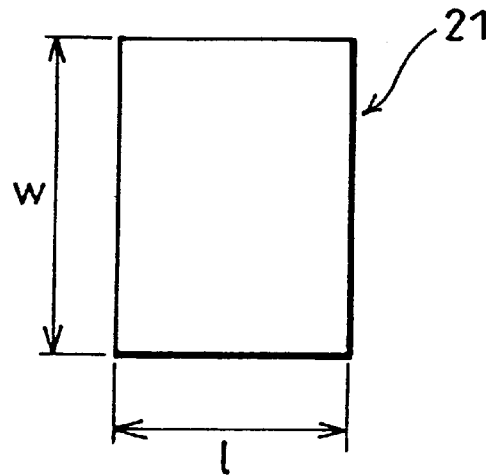
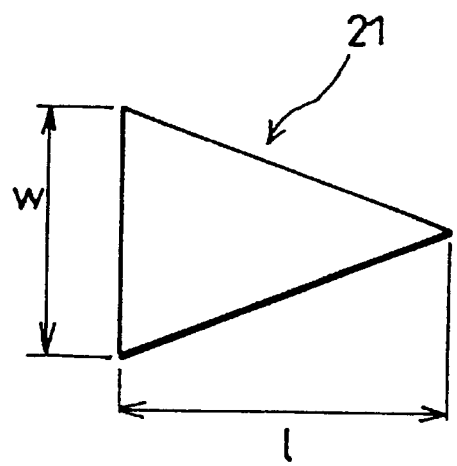
FIG. 5
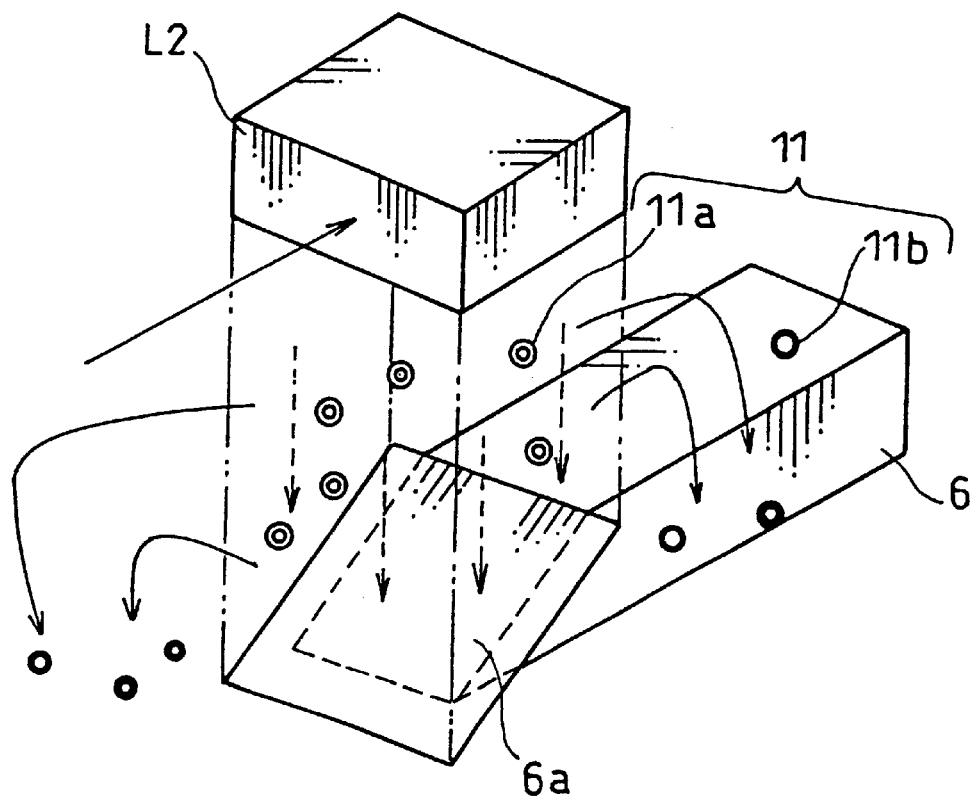

OPTICAL COMPONENTS INCLUDING AN OPTICAL ELEMENT HAVING A SURFACE THAT IS TAPERED

FIELD OF THE INVENTION

The present invention relates to methods of processing high polymeric organic films, and more particularly to methods of processing optical waveguides made of organic material and other optical components, as well as to optical components having a surface processed according to those methods of processing.

BACKGROUND OF THE INVENTION

In conventional technologies in the optical communications and optical information storage fields, mirrors having an inclination angle of 45° were primarily used as a member for optical path altering use. In addition, developments in micro-optics and optical integration technologies in recent years have urged studies to fabricate a mirror for optical path altering use with an inclination angle of 45° on optical components such as a hybrid integrated element and a monolithically integrated element. According to those studies, the mirror is provided on such optical components as a tapered surface having a 45° inclination angle.

Various methods of tapering a surface are suggested, including the planar process using the same printing technology as that used in semiconductor fields. An example of the planar process is disclosed in OPTICAL PLANES AND REFLECTORS, ANISOTROPICALLY ETCHED IN SILICON (The 7th International Conference on Solid-State Sensors and Actuators) and other literatures.

Problems with the tapering of a surface by means of a planar process include poor surface precision, such as lack of smoothness on the tapered surface, and the incorporating method thereof into products. Specifically, the method disclosed in the aforementioned paper, despite its mass-producing capability of tapered surfaces by means of anisotropic etching of an Si substrate and seemingly easy integration into a semiconductor and other electronic components, falls short of providing satisfactory levels of surface precision and a complete matching of the manufacturing process with the semiconductor process.

Accordingly, in order to solve those problems, new methods have been developed recently to taper a surface by processing a high polymeric organic film fabricated in a monolithic manner on a substrate.

Examples of such methods include: a method of tapering a resist, which is disclosed in Japanese Laid-Open Patent Application No. 7-135142/1995 (Tokukaihei 7-135142, published on May 23, 1995); a method of tapering by dry-etching a lower layer by means of a tapered resist, which is disclosed in Japanese Laid-Open Patent Application No. 8-241889/1996 (Tokukaihei 8-241889, published on Sep. 17, 1996); a method of tapering by processing a polyimide film with a dry-etching technique, which is disclosed in J. Electrochem. Soc. Vol.130, No.1, pages 129 to 134; and a method of tapering by cutting a high polymeric organic film with a diamond cutter so that a mirror is fabricated with a reflective surface having an inclination angle of 45, which is disclosed in MOC/GRIN' 97 TOKYO, P2, pages 390 to 393.

However, the surface tapered according to any of the preceding methods still fails to provide satisfactory levels of smoothness or finishing conditions and suffers from side production of foreign bodies, such as residua and cut-out dust, and from damage incurred on elements.

Accordingly, to solve the above problems, the use of a laser is suggested as a method of tapering a surface.

Here, a brief explanation will be given about processing technology using a laser.

Typically, ultraviolet rays are used to excite organic high polymer and thereby cut internal bonds thereof, or establish bonding between separate organic molecules together. Especially, pulse lasers having wavelengths in the ultraviolet region of the spectrum, having high levels of energy, can decompose and evapourate the organic high polymer instantly by cutting carbon bonds of the organic high polymer. The high polymeric organic material can be optically excited at a surface thereof in high concentration, by irradiating the high polymeric organic material with a pulse laser, which produces high luminance light $10^8$ to $10^9$ times as bright as normal light such as a mercury lamp and a xenon lamp. Especially, if luminance exceeds a certain threshold value, a phenomenon called abrasion occurs where the high polymer compound is decomposed at their bonds explosively into decomposed segments that will change into a plasma state and fly in all directions at supersonic velocity while emitting light.

An suitable method of patterning a high polymeric organic film is an abrasion process using an excimer laser. An excimer laser is a pulse laser having a wavelength in the ultraviolet region of the spectrum and a pulse width of 10 ns to 20 ns, and can be used to process a high polymeric organic film with non-thermal techniques when modified so as to produce high luminance light having an energy density of a few hundred $mJ/cm^2$ or greater.

Since there chiefly occurs an optical decomposition reaction in the excimer laser process as above, etching can be performed with little adverse thermal effect. Therefore, in comparison to RIE (Reactive Ion Etching) and other laser-associated processing techniques (YAG laser and carbon dioxide laser), excimer laser processing techniques are characterised by cleanness of processed shapes: i.e., the pattern in bodies to be processed (hereinafter will be called target bodies) does not melt, and few residua result from the process. In other words, unlike etching by a thermal process, that is, a technique to process material with heat, such as YAG laser processing and carbon dioxide laser processing techniques, excimer laser processing techniques are characterised by its ability to perform clean and precise processing.

A typical example of organic insulating films used for print substrates and optical waveguide elements is made of polyimide. In such a case, precise processing is facilitated if an excimer laser is used to fabricate a hole in the polyimide insulating film of a print substrate or to fabricate an optical waveguide from translucent polyimide.

Etching with an excimer laser is hence characterised as below:
1) The cross-section of the part that has been subjected to etching is smooth and clear-cut, and does cause incur thermal damage to the surroundings.
2) The shape and position can be controlled highly freely in micron levels.
3) The depth in etching can be controlled highly precisely up to about ±0.1 μm.
4) Radiation atmosphere can be created in any of the following states: in the air, in a reduced pressure state, and in a specific gas atmosphere.

An example of a tapering process using such an excimer laser is disclosed in Japanese Laid-Open Patent Application No. 4-330404/1992 (Tokukaihei 4-330404, published on Nov. 18, 1992) titled Method of Manufacturing Diffraction Grating (Conventional Technology A), and Japanese Laid-Open Patent Application No. 8-155667/1996 (Tokukaihei 8-155667, published on Jun. 18, 1996) titled Processing Device (Conventional Technology B).

Conventional Technology A discloses a method of fabricating a step of a triangular shape by irradiating a polyimide film with a laser that has passed through a mask from two oblique directions.

Conventional Technology B discloses a method of tapering a surface by working on the mask drive mechanism and the mask pattern of a laser processor so as to spatially altering the irradiated part of the target body, where the target body is irradiated with a laser beam, as well as the number of laser pulses emitted onto the target body.

According to Conventional Technologies A and B, a three-dimensional surface can be fabricated by highly precisely control the position, depth, and other values with respect to the processing of the target body.

Nevertheless, Conventional Technologies A and B have problems as follows.

According to Conventional Technology A, a tapering process is done by, for example, irradiating an organic material film 104b that is placed on a sample 104a, as a target body 104 on a stage 103, with a laser beam (light flux) emitted from an excimer laser exciting device 101 obliquely at a predetermined inclination angle by means of a movable mirror 102 as shown in FIG. 21.

In such a case, as shown in FIG. 22, a reaction product 106 sticks in the vicinity of a tapered surface of the target body 104. This is presumably because the processed part of the organic material film 104b is decomposed by laser abrasion into decomposed segments 105, which vapourise and ascend. Then, the decomposed segments 105, as they veer off the light flux, plunge at supersonic velocity due to cooling effect in the vicinity of the area where the processing is taking place.

The reaction product 106 clogs contact holes for wiring fabricated in the organic material film 104b for example, thereby reducing yields. Another problem possibly occurring from the reaction product 106 that is left over in the area where the processing is taking place is improper wire connections.

Moreover, if the reaction product 106 has a light absorbing property, the reaction product 106 sticking to optical components increases optical loss in the optical components, which is another problem.

Further, the reaction product 106, if once having stuck to the organic material film 104b, cannot be completely removed by washing and cleaning in an ordinary manner.

A tapering process according to Conventional Technology B entails the same problems as the tapering process in accordance with aforementioned Conventional Technology A, as well as the following problems.

According to Conventional Technology B, a V-shaped groove that will constitute the tapered shape can be formed by altering the shape of the mask pattern and moving the mask. Therefore, a tapering process requires the laser processing device to be equipped with a mask moving mechanism, which needs to be manufactured specifically for that purpose.

SUMMARY OF THE INVENTION

The present invention has an object to offer a method of processing that can, by using a conventionally existent processing device, form a smooth processed surface free from reaction product constituted by decomposed segments produced from a target body, as well as to offer optical components incorporating such a surface processed according to the method of processing.

In order to achieve the above object, the first method of processing in accordance with the present invention is a method of processing a target body by irradiating the target body with processing light so as to taper a light-irradiated surface of the target body, and includes the step of setting an irradiated region, where the target body is irradiated with the processing light, to be larger than an area formed by projecting a tapered part of the target body onto a horizontal plane, and irradiating the target body with the processing light while moving the target body and the processing light relative to each other.

According to the first method of processing, by irradiating the target body with the processing light while moving the target body and the processing light relative to each other, the target body can be processed gradually starting at a target end surface. As a result, the part of the target body irradiated with the processing light will become a processed target surface. Here, altering the relative velocity of the target body to the processing light permits changes in the tapered angle.

Besides, since the irradiated region, where the target body is irradiated with the processing light, is set to be larger than the area formed by projecting a tapered part of the target body onto a horizontal plane, the reaction product produced from the processed surface is further decomposed gradually by the processing light. This enables the resultant tapered surface to have no sticking reaction product and to be smooth in shape and satisfactory in optical properties.

In addition, in order to achieve the above object, the second method of processing in accordance with the present invention is a method of processing a target body by irradiating the target body with processing light so as to taper a light-irradiated surface of the target body, and includes the step of setting an irradiated region, where the target body is irradiated with the processing light, to be larger than an area formed by projecting a processed target part of the target body onto a horizontal plane, and irradiating the target body with the processing light while moving the target body and the processing light relative to each other.

According to the second method of processing, by setting the irradiated region, where the target body is irradiated with the processing light, to be larger than the area formed by projecting a processed target part of the target body onto a horizontal plane, and irradiating the target body with the processing light while moving the target body and the processing light relative to each other, the target body can be processed gradually starting at a target end surface thereof. As a result, the part of the target body irradiated with the processing light will become a processed target surface. Here, altering the relative velocity of the target body to the processing light or the magnitude of the irradiation energy of the processing light during the process readily permits changes in the shape of the processed surface.

Besides, since the irradiated region, where the target body is irradiated with the processing light, is set to be larger than the area formed by projecting a processed target part of the target body onto a horizontal plane, the reaction product produced from the processed surface is further decomposed gradually by the processing light. This enables the resultant processed target surface to have no sticking reaction product and to be smooth in shape and satisfactory in optical properties.

Further, an optical component may be fabricated by incorporating an optical element having a surface that is tapered according to the first or second method of processing so as to serve as an optical path altering surface.

In such a case, since the optical element has a surface that is tapered according to the first or second method of processing so as to serve as an optical path altering surface, optical components incorporating the optical element would facilitate the manufacture of small lenses and prisms between 0.1 mm and about 2 mm to 3 mm in diameter, and micro-optical components such as beam splitters.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) and 1(b) are plan and side views, respectively, schematically illustrating a method of processing in accordance with the present invention.

FIG. 2 schematically illustrates an arrangement of a processing device for carrying out the method of processing in accordance with the present invention.

FIG. 3 is a plan view showing a beam mask provided to the processing device shown in FIG. 2.

FIGS. 4 (a) and 4(b), showing the mask shapes of beam masks used in the method of processing, are explanatory drawings for a rectangular mask shape and a triangular mask shape respectively.

FIG. 5 is an explanatory drawing schematically showing a method of processing in accordance with the present invention.

FIGS. 19(a) through 19 (h) are explanatory drawings showing a series of processing steps of tapering the end surface of an optical waveguide, which is an application of the method of processing in accordance with the present invention.

DESCRIPTION OF THE EMBODIMENTS

[Embodiment 1]

Figure 6A:
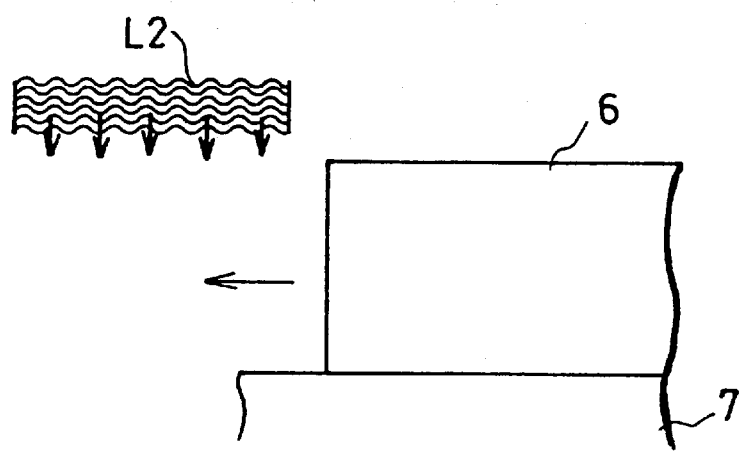
FIGS. 6(a) through 6(e) are explanatory drawings showing a processing step by means of the processing device shown in FIG. 2.

Referring to FIG. 1 through FIG. 12, the following description will discuss an embodiment in accordance with the present invention.

A processing device suitably used for the method of processing of the present embodiment incorporates an excimer laser processing system shown in FIG. 2. Note that a method of tapering an end surface of a target body to an inclination angle of 45° is taken as an example here and will be discussed.

First of all, the excimer laser processing system will be described in detail.

As shown in FIG. 2, the excimer laser processing system includes an excimer laser exciting device 1 and further includes a beam mask 2, a fixed mirror 3, a scale-down optical system 4, and a stage 5, which are positioned in this sequence along the radiation direction of the laser emitted from the excimer laser exciting device 1. On the stage 5 is mounted a substrate 7 for holding an organic insulating film 6, as a target body, made of a high polymeric organic polyimide film.

The excimer laser exciting device 1, available from Sumitomo Heavy Industries Co. Ltd., emits excimer lasers (hereinafter, will be called laser beams) of 248 nm in oscillation wavelength, 270 mJ in oscillation output, and 200 pulses/sec in oscillation frequency.

The beam mask 2 is for altering the shape of the region irradiated with the laser beam emitted from the excimer laser exciting device 1 (hereinafter, will be called the beam shape). In other words, the beam mask 2 is a modification-use mask for modifying the beam shape of the processing light into a predetermined shape.

For example, if a rectangular beam shape is required, the beam mask 2 shown in FIG. 3 is used. This beam mask 2 has a through hole 21 formed in the centre thereof to serve as a rectangular shape mask. Therefore, by changing the shape of the through hole 21, the beam shape can be readily altered. For example, the through hole 21 is formed in a rectangular shape of l in length and w in width as shown in FIG. 4(a) if a rectangular beam shape is required as the above, and in a triangular shape of l in height and w in base as shown in FIG. 4(b) if a triangular beam shape is required.

The fixed mirror 3 is for directing the laser beam, having passed through the beam mask 2, toward the stage 5. Suitably, a reflective mirror can be used for this purpose.

The scale-down optical system 4 includes a quartz convex lens and other components, and serves as an optical system for scaling down the region irradiated with the laser beam reflected by the fixed mirror 3 (hereinafter, will be called the beam area) in a predetermined scale ratio. By scaling down the beam area, the laser beam will have a higher radiation energy density. Note that in the present embodiment the scale down ratio of the beam area by the scale-down optical system 4 can be set to any desired value between 1/12.25 and 1/36.

The stage 5 includes a mechanism (not shown) for moving the substrate 7 horizontally with respect to the beam-irradiated surface, i.e., in x- and y-axis directions, as well as in a z-axis direction that is perpendicular to the beam-irradiated surface.

In the excimer laser processing system arranged in the above manner, the organic insulating film 6 that is placed, as a target body, on the substrate 7 mounted on the stage 5 is irradiated with the laser beam that has travelled through the beam mask 2, the fixed mirror 3, and the scale-down optical system 4, under conditions that the excimer laser exciting device 1 emitted from the laser beam has a 4.5 $cm^2$ beam area and a 60 $mJ/cm^2$ beam power, for example.

From the above, as shown in FIG. 2, a laser beam L0 emitted from the excimer laser exciting device 1 is modified in shape by the beam mask 2 to a laser beam L1 having a predetermined mask shape, then reflected by the fixed mirror 3, and altered by the scale-down optical system 4 to a laser beam L2 having an increased radiation energy density. Arrangements are made so that the laser intensities of these laser beams L0 through L2 have a relationship, L0=L1<L2, and that the laser intensity of the laser beam L2 has an enough magnitude to process the organic insulating film 6.

With all the preceding conditions being satisfied, since the scale-down optical system 4 scales down the beam area in a scale down ratio between 1/12.25 and 1/36, the radiation energy on the target body is about 0.735 to 2.16 $J/cm^2$, which is high enough to be called high luminance energy. Here, since the lower limit of energy for satisfactory polyimide processing is about 0.5 $J/cm^2$, it would be understood that the radiation energy of the laser beam L2 needs to be set as above to process the organic insulating film 6 made of polyimide high polymeric organic film of the present embodiment.

In a method of processing to obtain a tapered shape using the excimer laser processing system, as shown in FIGS. 1(a) and 1(b), arrangements are made so that the laser beam L2 produces a beam area S1 that is larger than the area S2 formed by projecting the target part 6a onto a horizontal plane, which target part 6a will become a tapered part of the organic insulating film 6, that the organic insulating film 6 is irradiated with the laser beam L2 starting at an end surface of the organic insulating film 6, and that the irradiation with the laser beam L2 is terminated when an end part 6b of the target part 6a coincides with a movable end part L2a of the laser beam L2.

According to the method of processing to obtain a tapered shape, as shown in FIG. 5, the reaction product 11 produced when the target part 6a of the organic insulating film 6 is processed with the laser beam L2 have different final states in and out of the region irradiated with the laser beam L2. In other words, the reaction product 11a in the region irradiated with the laser beam L2 is further decomposed into carbon dioxide, whereas the reaction product 11b out of that region remains decomposed, and those decomposed segments stick to the substrate and non-processed parts of the organic insulating film 6 as such.

Next, referring to FIG. 6(a) through FIG. 6(e), the following description will explain an example of the method of processing using the excimer laser processing system having the aforementioned arrangement. Here, a polyimide organic insulating film is taken as an example of an organic insulating film 6, that is a target body, and fabricated so that the polyimide organic insulating film has an about 45° sloping end surface (tapered surface) on the end part thereof.

According to the method of processing in accordance with the present invention, an organic insulating film 6 is processed with the mask shape, the moving direction, and the laser-beam-irradiated area of a target body being used as parameters. The processing conditions here are as follows.

The excimer laser exciting device 1 has the same oscillation as mentioned above, while the scale down ratio of the irradiation area is 1/12.25. In such a case, the laser power becomes equal to 0.735 $J/cm^2$.

The velocity of the stage 5, i.e., the velocity of the organic insulating film 6 that is a target body, is set to 2.5 mm/min.

The beam mask 2 used here has a shape shown in FIG. 3. The beam mask 2 is fabricated from SUS304 having a thickness of 1 mm, and has such a structure that a through hole 21 is formed substantially in the centre thereof.

A layer is fabricated on the quartz substrate 7 from a highly translucent polyimide (OPI Series N2005, available from Hitachi Chemical Co., Ltd.) using a photolithography technique so as to have a thickness of 40 $\mu$m, a width w of 400 $\mu$m, and a length l of 200 $\mu$m, and used as the organic insulating film 6 that is a target body.

FIG. 6(a) shows the relationship between the organic insulating film 6 mounted on the substrate 7 and the laser beam L2 before processing, and a following movement of the substrate 7 together with the organic insulating film 6 in the direction indicated by the arrow in the figure, in other words, toward the position where the organic insulating film 6 is irradiated with the laser beam L2.

Figure 6B:
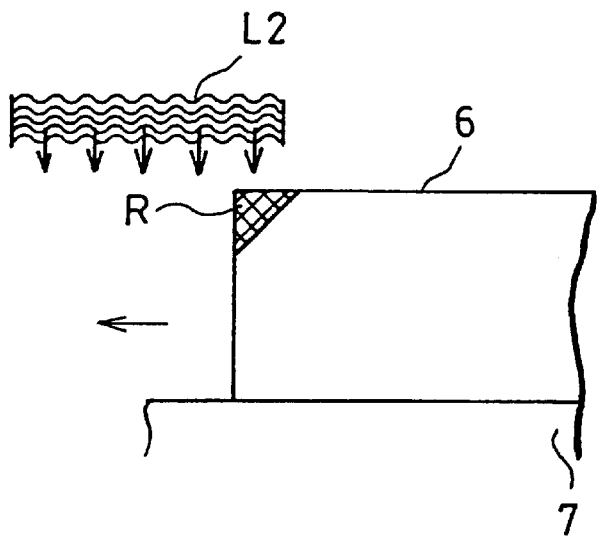
Figure 6C:
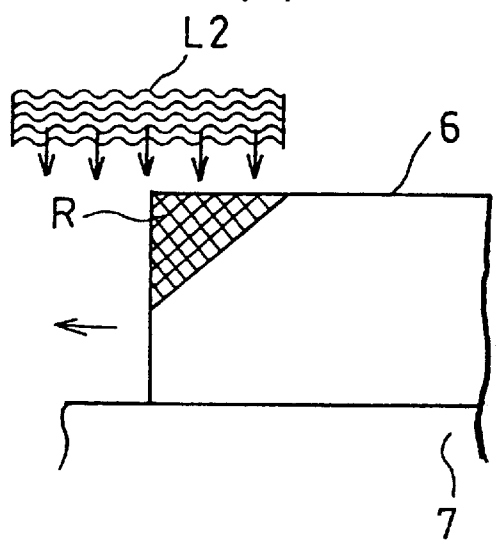
Figure 6D:
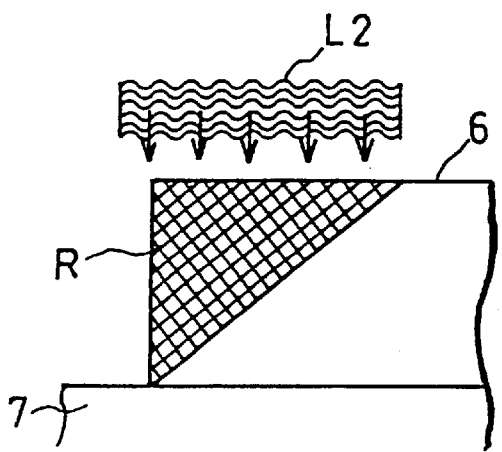

FIG. 6(b) through FIG. 6(d) show the gradual processing of the organic insulating film 6 mounted on the substrate 7, which starts at the end surface of the organic insulating film 6, and a resultant processed target region R that expands as the substrate 7 moves. Note in FIG. 6(b) through FIG. 6(d) that the processed target region R of the organic insulating film 6 is hatched to be distinguished from the non-processed region.

Figure 6E:
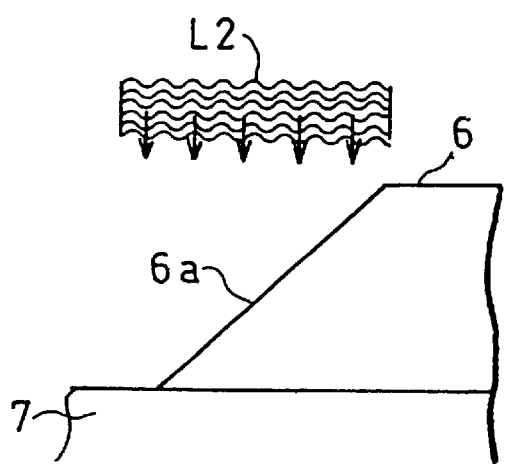
Figure 7:
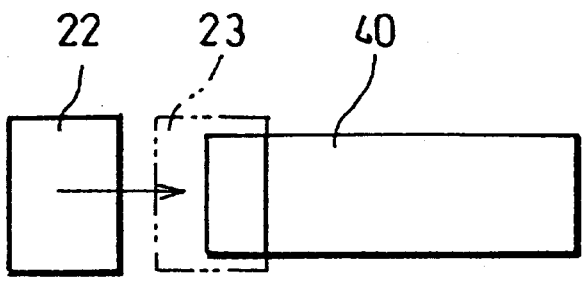
FIGS. 7(a) and 7(b) are explanatory drawings showing a processing example according to the method of processing in accordance with the present invention.
FIGS. 7(c) through 7(e) are explanatory drawings showing a processing example according to the method of processing in accordance with a comparative example.
Figure 7:
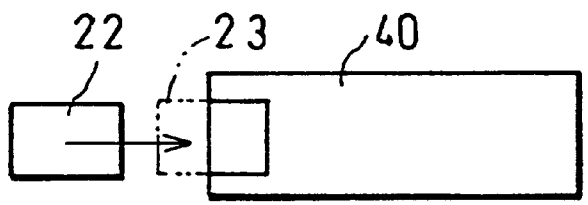
Figure 7:
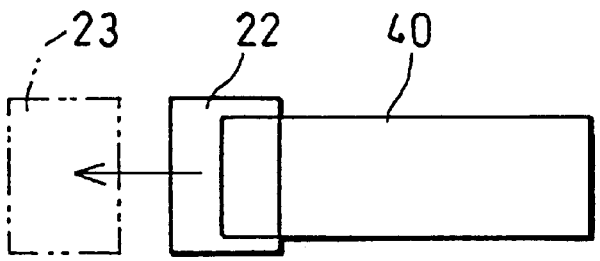
Figure 7:
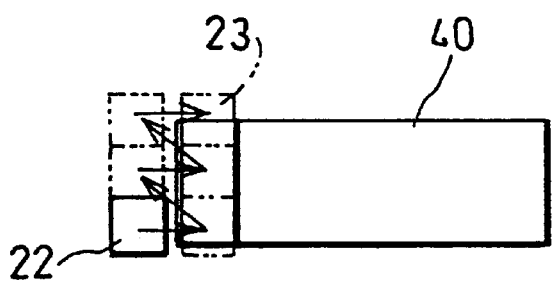
Figure 7:
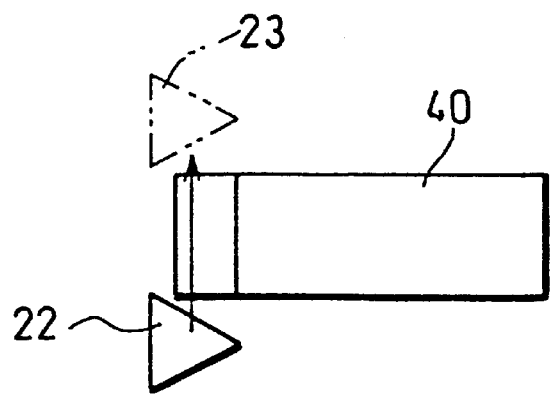

FIG. 6(e) shows a state following that shown in FIG. 6(d), in which the target region R of the organic insulating film 6 is completely processed, and thereby the fabrication of a target part 6a is completed. The processed target part 6a does not have sticking reaction product that occurs during the process, and therefore forms a smooth surface.

More specifically, first, with the excimer laser processing system shown in FIG. 2, the laser beam L2, having passed through the beam mask 2 and the scale-down optical system 4, is focused at the place where the target part 6a of the organic insulating film 6 that is a target body will be located.

Subsequently, a laser beam is emitted from the excimer laser exciting device 1. Here, as shown in FIG. 6(a), the organic insulating film 6 is not irradiated with the laser beam.

Next, following the state shown in FIG. 6(a), the stage 5 (see FIG. 2) is moved in the direction indicated by the arrow so as to move the organic insulating film 6 on the stage 5 at a constant velocity toward the position where the organic insulating film 6 is irradiated with the laser beam L2.

Then, as shown in FIG. 6(b) through FIG. 6(d), the organic insulating film 6 is gradually irradiated with the laser beam L2 starting at the end part thereof, to process the target region R gradually.

Finally, as shown in FIG. 6(e), when the organic insulating film 6 reaches a predetermined position, and the target part 6a is tapered, the emission of the laser beam from the excimer laser exciting device 1 is terminated and thereafter the stage 5 is stopped.

The processed surface (tapered surface) of the target part 6a of the organic insulating film 6 processed in the above steps is smooth and has no reaction product sticking thereto.

Referring to FIG. 7(a) through 7(e), the following description will explain various methods of processing to taper a target part 6a having an inclination angle of 45° as shown in FIG. 6(e). Note that FIG. 7(a) and FIG. 7(b) represent methods of processing in accordance with the present invention (embodiments 1 and 2), whereas FIG. 7(c) through FIG. 7(e) represent comparative methods of processing for the present invention (comparative Example 1 through Example 3). Note also that in FIG. 7(a) through FIG. 7(e) the position irradiated with a laser beam is drawn in solid lines 22 before processing and in broken lines 23 after processing.

Table 1 below shows processing conditions in the methods of processing.

TABLE 1

|  | Mask Shape and Area (L × W μm) Reference | Direction of Movement of Stage | Irradiated Area after Scaled Down in 1/12.25 μm × μm |
|---|---|---|---|
| Embodiment 1 | Rectangular 750 × 1500 Figure 7(a) | Toward Target End Surface | 214.3 × 429 |
| Embodiment 2 | Rectangular 750 × 500 Figure 7(b) | Toward Target End Surface | 214.3 × 142.9 |
| Comparative Embodiment 1 | Rectangular 750 × 1500 Figure 7(c) | Away from Target End Surface (Opposite of Embodiment 1) | 214.3 × 429 |
| Comparative Embodiment 2 | Rectangular 300 × 300 Figure 7(d) | Toward Target End Surface (Repeated) | 85.7 × 85.7 |
| Comparative Embodiment 3 | Triangular 500 × 500 × (1/2) Figure 7(e) | Perpendicular to Target End Surface (Perpendicular of Embodiment 1) | 142.9 × 142.9 × (1/2) |

Surface states were checked on the tapered surfaces processed under the processing conditions shown in Table 1. Here, optical waveguides 40 were made such that the end surfaces would be tapered with an inclination angle of 45° under the aforementioned processing conditions. The surface states of the processed surfaces, i.e., the tapered surfaces after the processing, were observed with an optical microscope to measure the surface roughness. Further, reflectances were measured on the tapered surfaces by letting a laser beam (wavelength 780 nm, output power 1 mW) passing through the optical waveguides 40. However, optical loss of the optical waveguides 40, etc. were not taken into account. Table 2 below shows the measurements.

TABLE 2

|  | State of Processed Surface | Surface Roughness of Processed Surface (μm) | Reflectance (%) |
|---|---|---|---|
| Embodiment 1 | Satisfactory | 0.1 or lower | 98 |
| Embodiment 2 | Satisfactory | 0.1 or lower | 98 |
| Comparative Embodiment 1 | Reaction Product Sticking | 0.35 | 65 |
| Comparative Embodiment 2 | Reaction Product Sticking | 0.4 | 60 |
| Comparative Embodiment 3 | Reaction Product Sticking | 0.21 | 67 |

The followings could be understood from the results shown in Table 2. In the embodiment 1 and the embodiment 2, which were applications of the method of processing in accordance with the present invention, the stage 5 was moved toward the target end surface, and the surface last irradiated with the laser beam was a tapered surface (mirror surface); it could be understood from microscope observation of the tapered surfaces that were processed surfaces that there was little reaction product sticking thereto, that the surface roughness of the processed surfaces was of satisfactory levels, and also that the reflectances were relatively high compared to the comparative examples 1 through 3. Therefore, it could be understood that it was preferable to move the stage 5 toward the target end surface and to use the surface last irradiated with the laser beam as the tapered surface.

By contrast, in the comparative example 1, when the stage 5 was moved away from the target end surface and irradiated with the laser beam, it was observed that there was reaction product sticking to the tapered surface after processing. Similarly to the comparative example 1, in the comparative examples 2 and 3, it was observed that there was reaction product sticking to the tapered surfaces after processing.

The reaction product sticking to the tapered surface was black organic substance (soot) that occurred when the organic insulating substance was processed. The reaction product sticking to the processed surface degraded the surface roughness and the reflectance by absorbing light, and made it impossible to use the target body as a high quality optical element.

The reaction product stuck to the processed surfaces under the processing conditions of the comparative examples 1 through 3, presumably, because of the following reasons.

Decomposed segments of the organic insulating film processed with laser beam soared, and experienced second decomposition and even third decomposition in the beam-irradiated region, and finally became carbon dioxide by reacting with ambient oxygen. Therefore, in the beam-irradiated region, the decomposed segments of the organic insulating film hardly changed into the reaction product, which enabled the reaction product to stick to the processed surfaces in smaller quantities.

Nevertheless, when the laser beam was moved during the processing, since the target surface itself was moving, the decomposed segments produced from the subsequent part of the target surface were scattered, and the reaction product stuck to the target surface that had been processed and no longer irradiated with the laser beam and also stuck to other regions that were not being irradiated with the laser beam.

In other words, the decomposed segments scattered in the moving direction of the laser beam were decomposed again by the irradiation with the laser beam, and therefore the reaction product that stuck again was decomposed again. By contrast, out of the laser-beam-irradiated region in the rear side with respect to the laser beam movement, the decomposed segments remained stuck as reaction product.

For these reasons, it was understood that in a tapering process using a laser beam, the end surface last irradiated with laser beam, i.e., the processed target end surface, had the least quantities of reaction product sticking thereto.

Therefore, in the embodiments 1 and 2, by irradiating the desired target surfaces lastly in the processing, reaction product could be prevented from sticking, and a smooth and optically satisfactory processed surfaces could be obtained. By contrast, it was understood that in the comparative examples 1 and 2, since the desired target surfaces were not irradiated lastly, the reaction product having stuck to the processed surface remained without being decomposed again, and a smooth processed surface could not be obtained.

Hence, in order to obtain a smooth processed surface with no reaction product sticking thereto, it is necessary to irradiate the target surface with a laser beam throughout the process. In other words, when the organic insulating film 6 that is a target body is irradiated by the laser beam that has been emitted from the excimer laser exciting device 1 and has passed through the beam mask 2 and the scale-down optical system 4, the irradiation area (beam area) on the target surface needs to be larger than the area formed by projecting the tapered surface fabricated by laser beam irradiation onto a horizontal plane. Further, the tapered surface needs to be fabricated at a part, of the target part 6a, which is irradiated with the laser beam lastly.

Note that in the foregoing methods of processing, the target body was moved to the irradiation position where the target body was irradiated with the laser beam; however, this is not the only possibility. For example, the laser beam, when directed to irradiate the position where the target body should be tapered, similarly produces a smooth and optically satisfactory tapered surface with no reaction product sticking to the position lastly irradiated with the laser beam.

Figure 8:
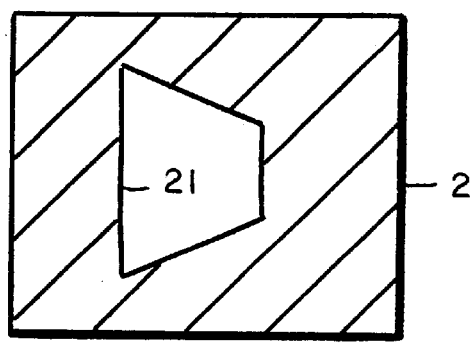
FIG. 8 is a plan view showing a beam mask used for another processing example of the method of processing in accordance with the present invention.

Next, referring to FIG. 2 and FIG. 9 through FIG. 12, the following description will explain the processing of the target surface when the through hole 21 of the beam mask 2 has a trapezoidal shape as shown in FIG. 8.

The processing conditions employed here are as follows.

The laser beam emitted from the excimer laser exciting device 1 is specified to have a beam area of 4.5 cm$^2$ and a beam power of 60 mJ/cm$^2$. The scale down ratio for the irradiation area is specified to 1/6. In other words, the process laser power of the laser beam L2 is equivalent to 2.16 J/cm$^2$. The velocity of the laser beam L2, i.e., the velocity of the stage 5 is specified to 5 mm/min.

Further, the same highly translucent polyimide (OPI Series N2005, available from Hitachi Chemical Co., Ltd.) as the aforementioned organic insulating film 6 is fabricated in film form and used as a target body.

Figure 9:
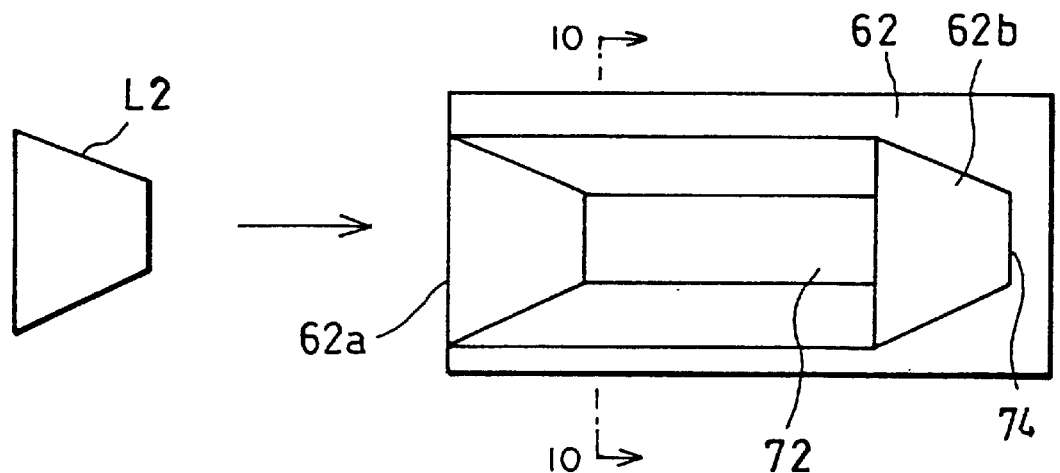
FIG. 9 is an explanatory drawing showing another processing example of the method of processing in accordance with the present invention.

As shown in FIG. 9, the stage 5 is moved so that the laser beam L2 having a trapezoidal beam shape moves on the film 62 made of an insulating organic material that is a target body, starting at a front end part 62a of the film 62 to a finishing end part 62b thereof that is a predetermined position, and the irradiation with the laser beam L2 is terminated before the stage 5 stops moving.

Figure 10:
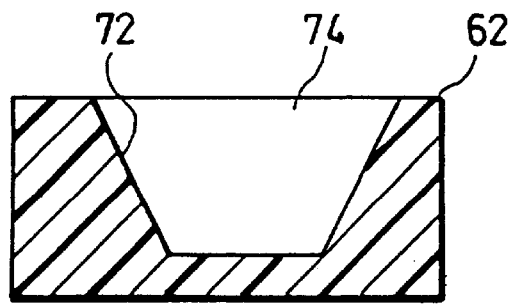
FIG. 10 is a cross-sectional view taken along line 10–10 of a film that has been processed with the method of processing shown in FIG. 9.

Therefore, as shown in FIG. 10, a substantially figure-V shaped groove (substantially V-shaped groove 72 is formed in the part of the film 62 that is irradiated with the laser beam L2. Similarly to the above case, a 45° tapered surface 74 is formed at the finishing end part 62b, which is lastly irradiated with the laser beam L2. The tapered surface 74 is a smooth and optically satisfactory surface with no reaction product sticking thereto, since the irradiation with the laser beam L2 is terminated before the stage 5 stops moving.

The tapered surface 74 having an inclination of 45° that is fabricated from the film 62 as detailed above may be used as an optical reflective surface (optical path altering surface), and the following description will describe an example of such an application.

Figure 11:
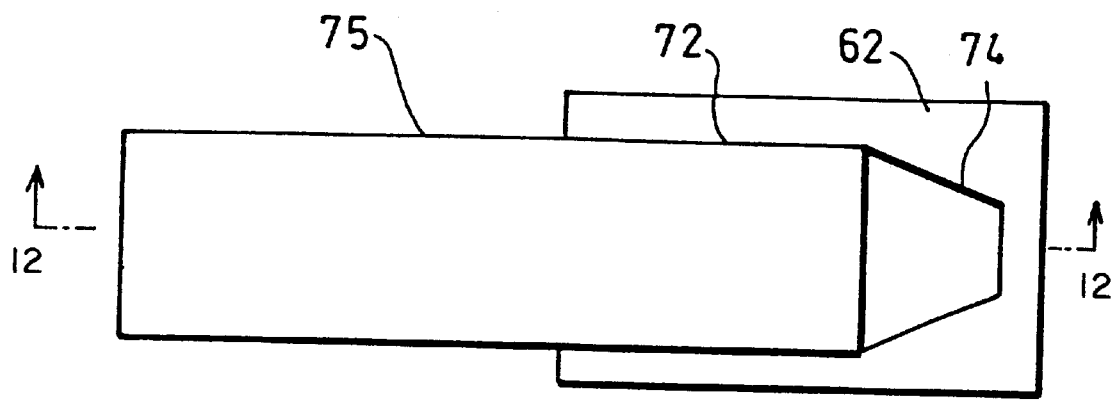
FIG. 11 is a plan view showing an optical fibre placed on a film having a substantially V-shaped groove fabricated with the method of processing shown in FIG. 9.

First of all, the film 62 on which the substantially figure-V shaped groove 72 is formed as mentioned above is cut along line a–a'. Then, as shown in FIG. 11, the groove 72 is used as a groove in which the optical fibre 75 is mounted. Therefore, the size of the groove 72 is specified according to the diameter of the optical fibre 75.

Figure 12:
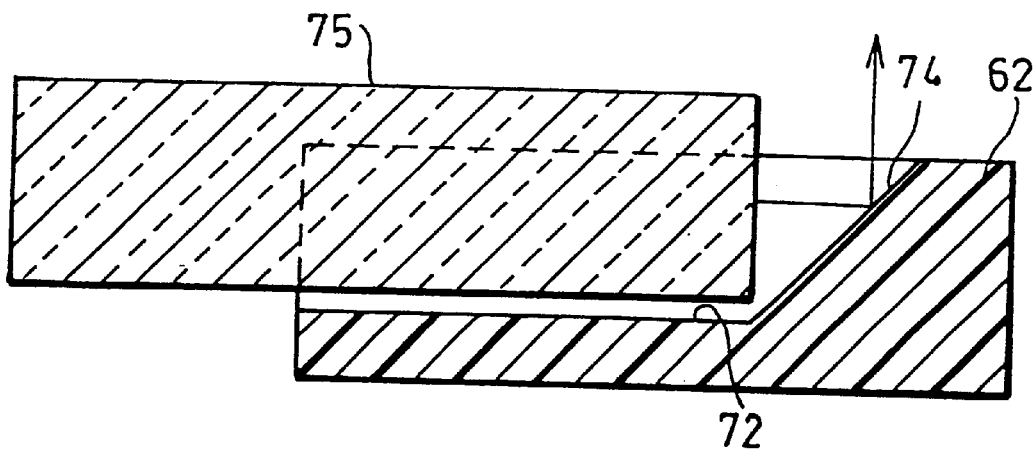
FIG. 12 is a cross-sectional view taken along line 12–12 in the plan view shown in FIG. 11.

When the optical fibre 75 is mounted in the groove 72 of the film 62 in this manner, light from the optical fibre 75 is vertically reflected at the tapered surface 74, as shown in FIG. 12. In other words, the tapered surface 74 inclined 45° alters the optical path of light radiating from the optical fibre 75 by 90°. Note that since the tapered surface 74 is the finishing end part 62b of the film 62, the irradiation with the laser beam L2 is terminated after the stage 5 stops moving. Therefore, there is no reaction product sticking to the tapered surface 74. Further, although there is reaction product sticking to the groove 72, the sticking reaction product does not form a thick layer, giving no adverse effect to the position matching of the optical fibre 75.

However, when light is reflected at the tapered surface 74 of the film 62 as described above, light emitted from the optical fibre 75 enters a polyimide having a high refractive index n (n=1.8) from air having a low refractive index n (n=1), the reflectance is therefore low. Hence, in order to fabricate a absolute optical path altering surface (mirror surface) out of the tapered surface 74, it is necessary to fabricate a highly reflective metallic film, such as Al, or a dielectric multi-layer film on the surface. That is, when light having a wavelength of 780 nm enters the tapered surface 74 that is a 45° inclined surface at an incident angle of 45°, only about 10% of the light is reflected by polyimide having a refractive index of 1.8.

Accordingly, the following three methods can be suitably used to increase the reflectance of the mirror surface, i.e., the tapered surface 74.

Figure 13:
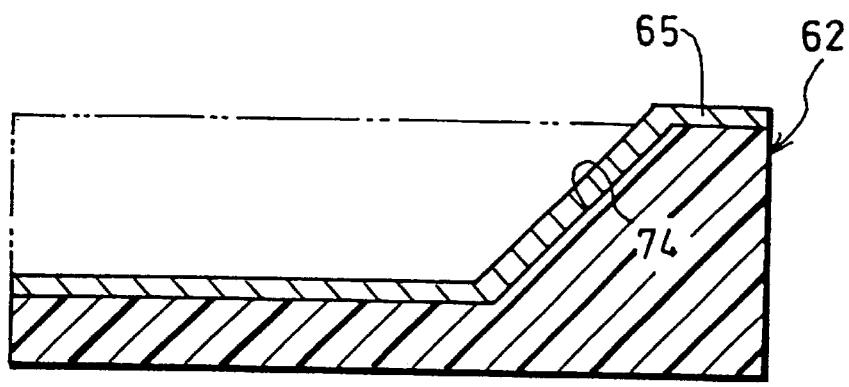
FIG. 13 is an explanatory drawing showing a metallic film coating the surface of a film produced with the method of processing shown in FIG. 9.

According to the first method, the tapered surface 74 on the film 62 is coated, using a sputtering technique, with a light blocking film 65 made of Al having a thickness of 40 nm or greater as shown in FIG. 13. With the coating with the light blocking film 65, light having a wavelength of 780 nm shows a reflectance of 81% with the P wave and 90% with the S wave at the mirror surface on the tapered surface 74. Note that the Al coating may be done by electron beam vapour deposition and metal CVD rather than sputtering.

Figure 14:
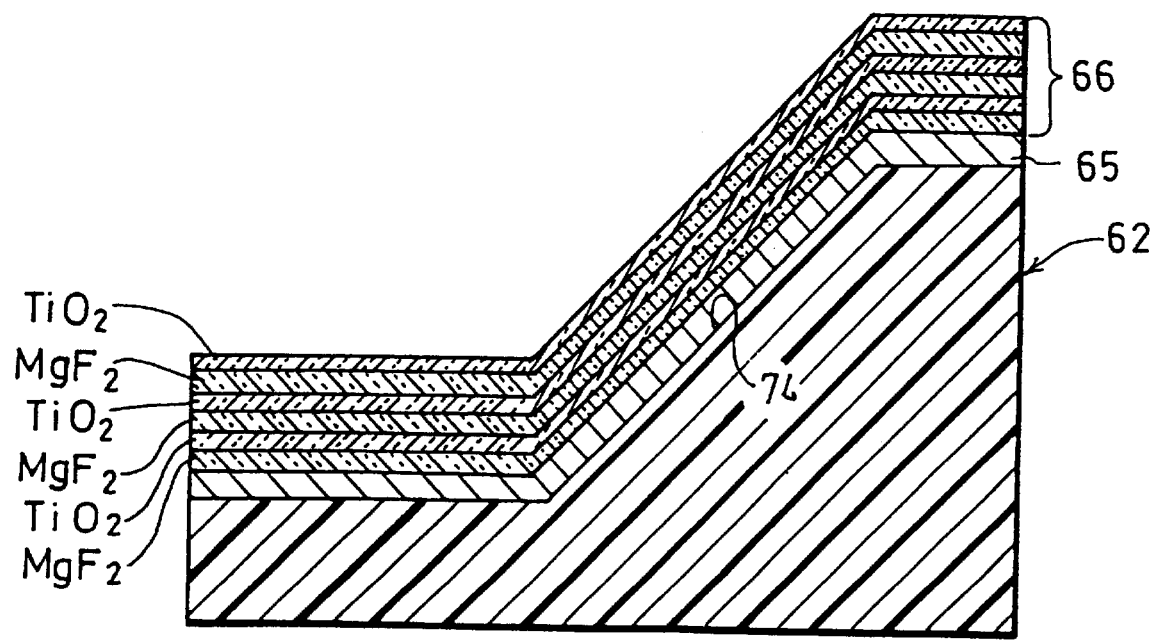
FIG. 14 is an explanatory drawing showing a dielectric multi-layer film further fabricated on the metallic film shown in FIG. 13.

According to the second method, as shown in FIG. 14, a dielectric multi-layer film 66 is fabricated on the surface of the light blocking film 65 fabricated on the film 62 shown in FIG. 13, the dielectric multi-layer film 66 being constituted by an MgF$_2$ film (150 nm thick), a TiO$_2$ film (90 nm thick), an MgF$_2$ film (165 nm thick), a TiO$_2$ film (90 nm thick), an MgF$_2$ film (170 nm thick), and a TiO$_2$ film (90 nm thick) in this order when viewed from the side of the light blocking film 65. Light having a wavelength of 780 nm shows a reflectance of 96% with the P wave and 99% with S wave at the mirror surface on the tapered surface 74 on which the dielectric multi-layer film 66 is fabricated. Note that the thicknesses of the $MgF_2$ films and the $TiO_2$ films need to be selected so that $MgF_2$ and $TiO_2$ roughly have minimum and maximum reflectances respectively when used alone.

Figure 15:
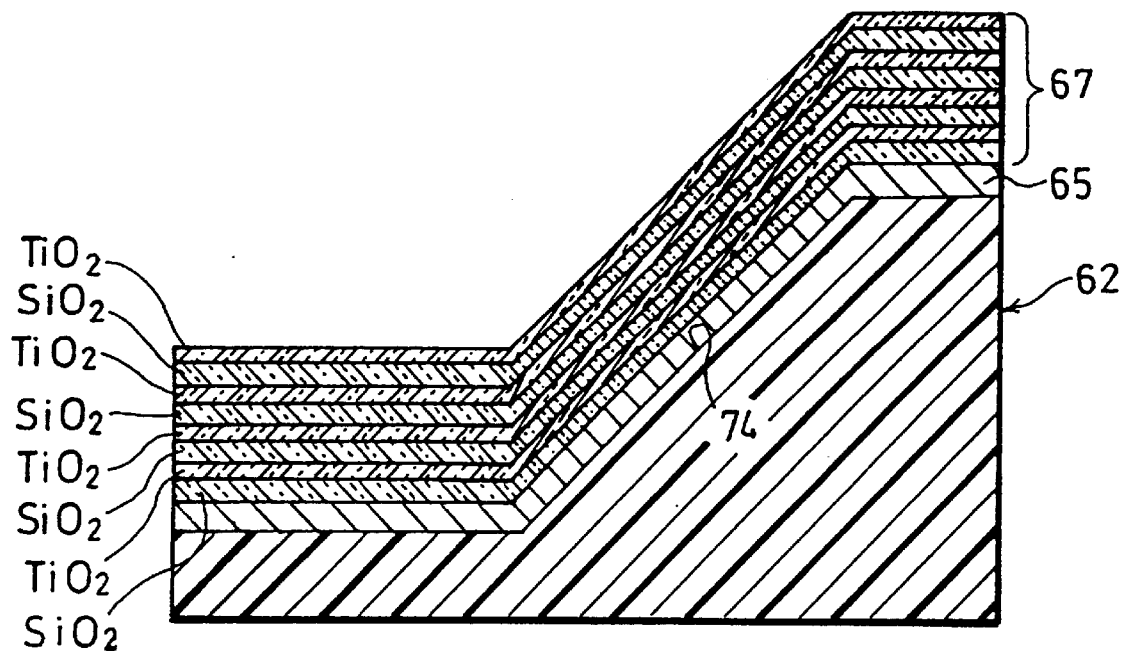
FIG. 15 is an explanatory drawing showing another dielectric multi-layer film further fabricated on the metallic film shown in FIG. 13.

According to the third method, as shown in FIG. 15, a dielectric multi-layer film 67 is fabricated on the surface of the light blocking film 65 fabricated on the film 62 shown in FIG. 13, the dielectric multi-layer film 67 being constituted by an $SiO_2$ film (140 nm thick), a $TiO_2$ film (90 nm thick), an $SiO_2$ film (150 nm thick), a $TiO_2$ film (90 nm thick), an $SiO_2$ film (155 nm thick), a $TiO_2$ film (90 nm thick), an $SiO_2$ film (155 nm thick), and a $TiO_2$ film (90 nm thick) in this order when viewed from the side of the light blocking film 65. Light having a wavelength of 780 nm shows a reflectance of 99% with the P wave and a reflectance of 100% with the S wave at the mirror surface on the tapered surface 74 on which the dielectric multi-layer film 67 is fabricated.

These results conclude that it is preferable to fabricate an Al film on the side of the light blocking film 65, i.e., the film located down deep with respect to the incident light direction, from a low refractive index material so as to have a thickness that shows a minimum reflectance when the Al film is used alone, and also to fabricate a film on the light entering side from a high refractive index material so as to have a thickness that shows a maximum reflectance when the film is used alone. Further, the results show that the greater the difference in refractive index between the two kinds of materials, the further the reflectance is enhanced.

Note that the above description regarding the present embodiment was made on the basis that the irradiation position of the laser beam was fixed, while the target body was moved to the irradiation position of the laser beam: however, this is not the only possibility. For example, the target body is fixed, while the irradiation position of the laser beam is moved toward the target body. Further, the target body and the irradiation position of the laser beam may be both moved toward each other.

Moreover, the above description regarding the present embodiment was made on the basis that the tapered surface having an inclination angle of 45° was fabricated by irradiating the target body with the laser beam; however, this is not the only possible method of processing in accordance with the present invention. In the present embodiment, when a tapered surface was fabricated from a target body, the radiation energy of the laser beam and the velocity of the target body were both held constant; nevertheless, the shape of the processed part on the target body can be altered if the radiation energy of the laser beam is changed in magnitude or the velocity of the target body is changed. In any of such cases, a smooth surface can be obtained similarly to the above description since there is no reaction product sticking to the processed part.

Note that in the present embodiment an excimer laser was used for the processing; however, this is not the only possibility. For example, $CO_2$ and other kinds of laser can be used. If a $CO_2$ laser is used for the processing, since a lot of heat is produced during the process, the target body needs to be made of a material that does not deform with heat. Further, when an excimer laser is used for the processing, the processing is done by means of abrasion. Therefore a lot of choices are available for the combination of the target body with the bed substrate, etc., and a suitable choice can be made to prevent the bed substrate, etc. from being damaged. If a $CO_2$ laser is used for the processing, since a lot of heat is produced during the process, relatively less choices are available for the combination of the target body with the bed substrate, etc. and result in giving damage to the bed substrate, etc.

This makes it more important to start the irradiation of the target body using a processing-use light source after the target body starts moving. Supposing that the irradiation of the target body using a processing-use light source is started before the target body starts moving, since the stationary substrate on which the target body is mounted is irradiated with the processing light from the processing-use light source, the substrate is more damaged rather than the target body is processed, likely to cause the bed coating the substrate to peel off or crack.

Note that any laser may be used for the present invention as long as the laser is capable of performing an abrasion process; some typical lasers used for this purpose are an excimer laser (described above), a $CO_2$ laser, and an YAG laser. Among these lasers, the excimer laser show a satisfactory processing precision, and therefore it can be said that the excimer laser is best suited to process high polymeric organic films including optical waveguides.

Incidentally, the three kinds of lasers are used for the method of processing in accordance with the present invention under following conditions.

① Excimer Laser: ArF wavelength 192 nm, KrF wavelength=248 nm, and XeCl wavelength 308 nm.
② $CO_2$ Laser: high-peak, short-pulse type, wavelength= 9.4 through 9.6 μm to 10.6 μm.
③ YAG Laser: wavelength of tertiary high frequency wave=1.064/3 μm, and wavelength of quaternary high frequency wave=1.064/4 μm.

These conditions for the use of a laser are modified depending upon the kind of the material to be processed (target body). Since the absorption wavelength for a laser varies from material to material, and the conditions need to be modified to ensure that laser is used in wavelengths of a high absorption efficiency.

In the above, the present embodiment showed that the resultant processed surface was smooth and had satisfactory optical properties, and also discussed the reflectance of the mirror surface that exploits those attributes to alter the optical path. The embodiment 2 below will discuss specific examples of optical components to which the method of processing is applied.

[Embodiment 2]

Figure 16:
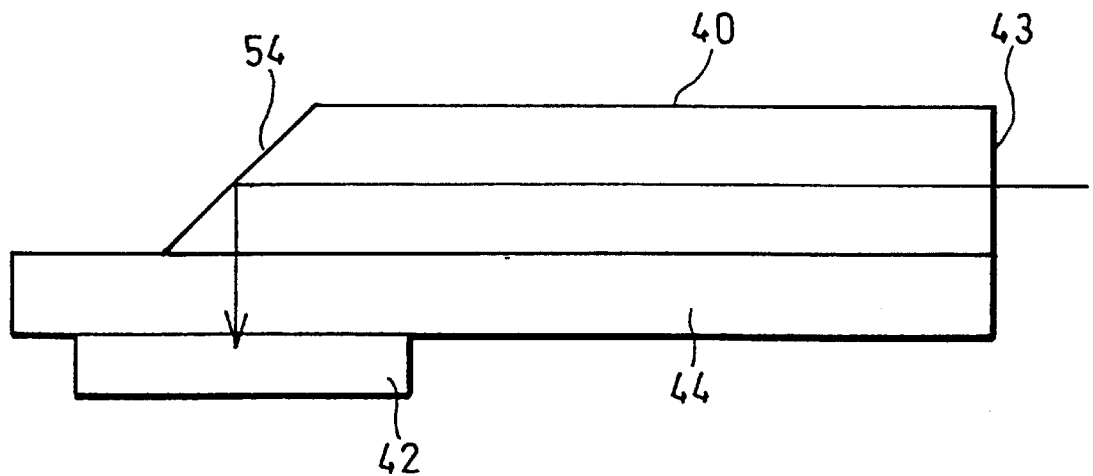
FIG. 16 is an explanatory drawing showing a travelling path of a light ray when the end surface of an optical waveguide is fabricated to serve as a mirror having an inclination angle 45°.

Optical components of the present embodiment, as shown in FIG. 16, include an arrangement where an optical waveguide 40 is fabricated on a translucent substrate 44.

A tapered surface 54 is fabricated at one of the ends of the optical waveguide 40. The tapered surface 54, being fabricated according to the method of processing disclosed in the embodiment 1, is a smooth surface with no reaction product sticking thereto. Further, the tapered surface 54 is processed to have an inclination angle of 45°, and a photodiode 42 for receiving optical signals is provided, interposed by a substrate 44, below the tapered surface 54. In other words, arrangements are made so that optical signals (hereinafter, will be simply called as light) entering an end part 43 of the optical waveguide 40 parallel to the substrate 44 travels through the optical waveguide 40, reflects at the tapered surface 54, then passes through the substrate 44, and enters the photodiode 42.

Note that, as shown in FIG. 16, when light enters the optical waveguide 40 parallel to the substrate 44, it is preferable to set the inclination angle of the tapered surface 54 of the optical waveguide 40 to 45°. By setting the inclination angle of the tapered surface 54 to 45°, light can be efficiently fed to the photodiode 42. Nevertheless, since the optimum inclination angle of the tapered surface 54 varies depending on the location of the photodiode 42, the incident angle of light on the optical waveguide 40, and other factors, the inclination angle of the tapered surface 54 needs to be modified as required.

Incidentally, the tapered surface 54 of the optical waveguide 40 shown in FIG. 16 is processed, according to the method of processing disclosed in the preceding embodiment 1, by terminating the irradiation of the laser beam L2 before the optical waveguide 40 stops moving. This enables the tapered surface 54 extending from the top to bottom of the optical waveguide 40 to be smooth.

This forces light external to the optical waveguide 40 to be reflected thereby except the light passing through the end part 43, preventing any external light from entering the tapered surface 54 of the optical waveguide 40. Hence, the photodiode 42 is fed only with the light entering the end part 43 and then travelling through the optical waveguide 40, and consequently optical components using the photodiode 42 will have higher reliability.

Nevertheless, if in the processing of the tapered surface 54 of the optical waveguide 40 the irradiation with the laser beam L2 is terminated after the optical waveguide 40 stops moving, the tapered surface 54 is excessively processed by the laser beam L2. For example, the tapered surface 54 of the optical waveguide 40 as shown in FIG. 16 is further processed with the laser beam L2 to form a tapered surface 54' whose upper part 54'a is vertically processed as shown in FIG. 17.

Figure 17:
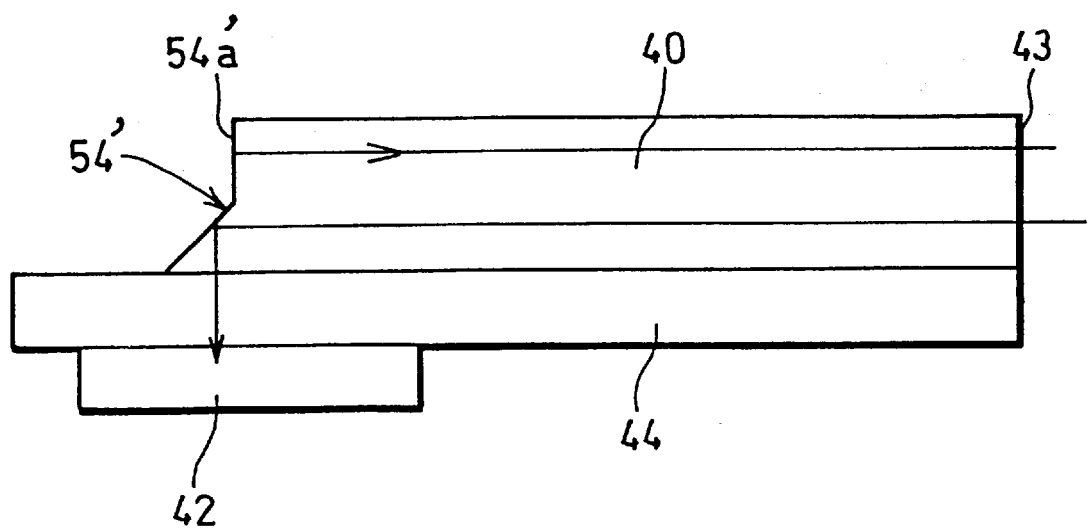
FIG. 17 is an explanatory drawing showing travelling paths of light rays when the end surface of an optical waveguide is not fabricated to serve as a mirror having an inclination angle of 45°.

In such a case, as shown in FIG. 17, since light entering the end part 43 of the optical waveguide 40 may partially leak out of the tapered surface 54' at the upper part 54'a, the optical waveguide 40 fails to efficiently guide light to the photodiode 42.

Therefore, in order to manufacture optical components with excellent optical properties as shown in FIG. 16, it is necessary to terminate the irradiation of the laser beam L2 before the optical waveguide 40 that is a target body stops moving.

Figure 18:
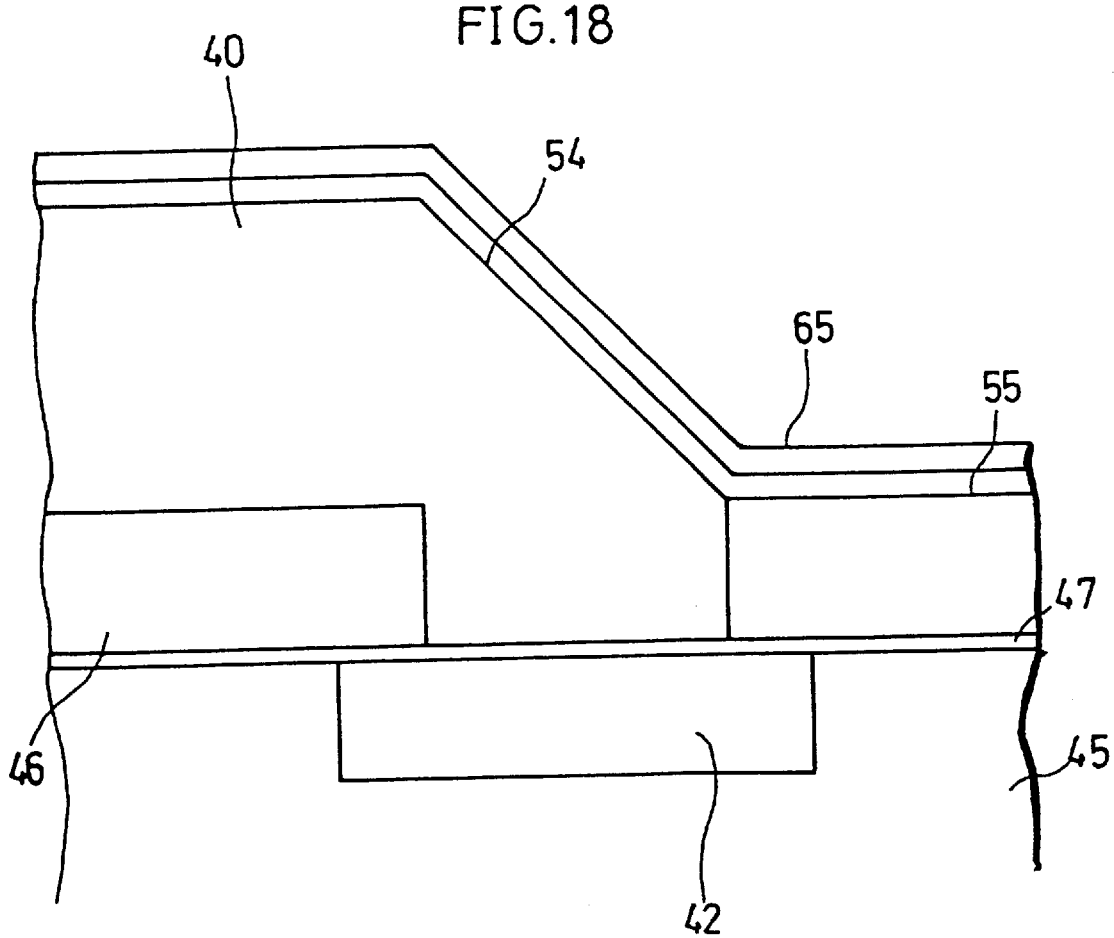
FIG. 18 is an explanatory drawing showing a structure of a photodiode and the mirror having an inclination angle of 45° fabricated on the end surface of the optical waveguide shown in FIG. 16, which are fabricated in a monolithic manner.

Another optical component of the present embodiment, as shown in FIG. 18, includes an arrangement where an optical waveguide 40 is fabricated, interposed by a buffer layer 46, on a silicon substrate 45, and a photodiode 42 is provided on the silicon substrate 45. In other words, the photodiode 42 is monolithically bonded to the tapered surface 54 fabricated on an end surface of the optical waveguide 40.

The tapered surface 54 is fabricated on the end part of the optical waveguide 40, and the buffer layer 46 is provided right beneath the tapered surface 54.

The buffer layer 46 is composed of a silicon oxide film, such as PSG (Phosphorous Silicate Glass) and SOG (Spin on Glass).

Further, a reflection preventive film 47 is provided on the top of the photodiode 42 to prevent light having passed through the optical waveguide 40 from being reflected at the photodiode 42, thereby maximising the amount of light that enters the photodiode 42. A silicon nitride film is used as the reflection preventive film 47.

The amount of light fed to the photodiode 42 was measured on the thus-arranged optical component by directing a laser in a visible range of 600 nm to 650 nm so as to enter an end part of the optical waveguide 40, the end part being located opposite to the end where the tapered surface 54 is fabricated, and it was found that light sensitivity has improved by 150% to 200% compared to the case where no tapered surface 54 is fabricated.

Therefore, in a thus-arranged optical component, since a tapered surface 54, fabricated on the optical waveguide 40, has a mirror function, light guided into the optical waveguide 40 is refracted at substantially right angles at the tapered surface 54 and enters the photodiode 42. Therefore, the light inside the optical waveguide 40 hardly leaks out through the tapered surface 54, entering the photodiode 42 highly efficiently.

Further, as shown in FIG. 18, by sequentially forming a clad layer 55 and a light blocking film 65 on the tapered surface 54 of the optical waveguide 40, light guided by the optical waveguide 40 can enter the photodiode 42 more efficiently.

In such a case, the clad layer 55 and the light blocking film 65 are disposed so as to cover the optical waveguide 40, the tapered surface 54, and the buffer layer 46, and forms a reflective mirror surface on the side of the substrate 45.

A widespread problem was that there were difficulties in uniformly forming the clad layer and the light blocking film on a cross-section, of the optical waveguide, which is perpendicular to the substrate, which lead to poor attachment of the film to the optical waveguide and resultant high probability of peel off.

Nevertheless, as shown in FIG. 18, by processing the finishing end part of the optical waveguide 40 into a tapered surface 54, the film (the clad layer 55 and the light blocking film 65) better covers the optical waveguide 40 and can be prevented from peeling off or being poorly attached.

Here, the clad layer 55 is made of a silicon oxide film, and, in the present embodiment, fabricated using a CVD (Chemical Vapor Deposition) technique. The clad layer 55, having a higher refractive index than air, shows little Fresnel reflection at the tapered surface 54.

Further, when electrostatic shielding is required, a metallic film is typically used as the light blocking film 65. In the present embodiment, a 99.9% pure Al film is used. Since Al generally has a high reflectance, the Al film reflects the light that has travelled from the side of the optical waveguide 40 and passed through the clad layer 55 without being reflected at the clad layer 55. Therefore, the practical reflectance at the tapered surface 54 increases in some cases, depending on the refractive index of the core, i.e., the refractive index of the optical waveguide 40.

For example, referring to FIG. 18, a comparison is made between reflectances when the light having a wavelength of 650 nm and travelling through the optical waveguide 40 from the left-hand side to the right-hand side is reflected at the tapered surface 54 having an inclination angle of 45°.

First, an explanation will be given to a case where a polyimide having a refractive index of 1.8 is used for the optical waveguide 40.

With the optical waveguide 40 being covered with neither the clad layer 55 nor the light blocking film 65, the light propagating through the optical waveguide 40 showed a reflectance of 100% when the incident angle on the tapered surface 54 was larger than 35°, and showed a reflectance of about 65% with the P wave and about 68% with the S wave on average for all possible incident angles on the tapered surface 54 of 35° or smaller. By contrast, with the optical waveguide 40 being covered with the clad layer 55 and the light blocking film 65, the reflectance on average for all possible angles on the tapered surface 54 was about 72% for the P wave and about 87% for the S wave.

Next, the following description will discuss the use of a polyimide fluoride having a refractive index of 1.55 as the optical waveguide 40.

With the optical waveguide 40 being covered with neither the clad layer 55 nor the light blocking film 65, the light propagating through the optical waveguide 40 showed a reflectance of 100% when the incident angle on the tapered surface 54 was larger than 40°, and showed a reflectance of about 56% for the P wave and about 60% for the S wave on average for all possible incident angles on the tapered surface 54 of 40° or smaller. By contrast, with the optical waveguide 40 being covered with the clad layer 55 and the light blocking film 65, the reflectance on average for all possible angles on the tapered surface 54 was about 72% for the P wave and about 87% for the S wave.

From these results, if the tapered surface 54 has an inclination angle of 45°, the reflectance is high and there is no problem, provided either that the light propagating through the optical waveguide 40 is parallel to the substrate 44 (hereinafter, will be called parallel light) or that the light passing through the optical waveguide 40 is not parallel to the substrate 44 (hereinafter, will be called divergent light).

Nevertheless, if the light propagating through the optical waveguide 40 is divergent and the incident angle on the tapered surface 54 is small, in other words, if there is lot of light entering at angles almost 90°, the clad layer 55 and the light blocking film 65 covering the optical waveguide 40 will contribute to increases in the reflectance.

Note that in the present embodiment an Al film was used as the light blocking film 65; however, this is not the only possibility. The light blocking film 65 may be of any other metallic film as long as the film is made of a highly reflective material such as Ag.

The following description will discuss a process of manufacturing an optical waveguide 40 having a tapered surface 54 having an inclination angle of 45° on a substrate made of quartz or silicon.

First of all, referring to FIG. 19(*a*) through FIG. 19(*h*), the aforementioned process will be explained in a case where the optical waveguide 40 is to be manufactured with a tapered surface 54 having an inclination angle of 45° on a substrate made of a quartz having a refractive index of 1.46.

Figure 19:
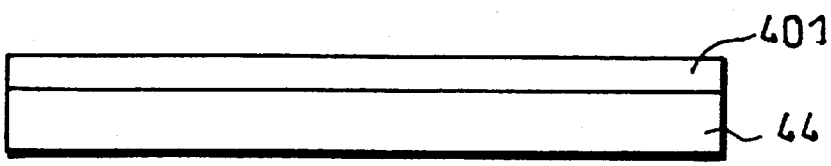
Figure 19:
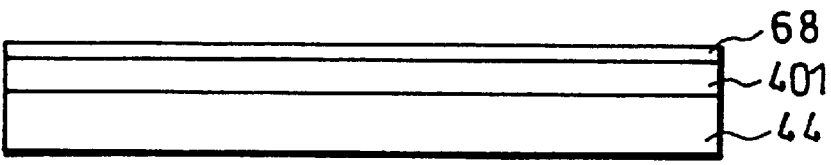
Figure 19:
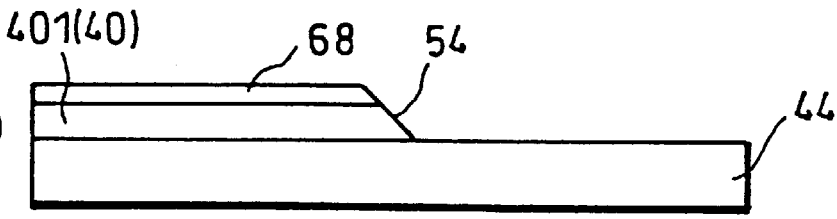
Figure 19:
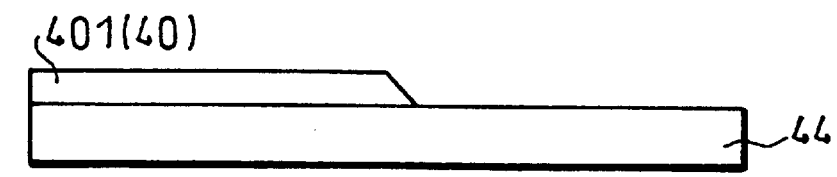
Figure 19:
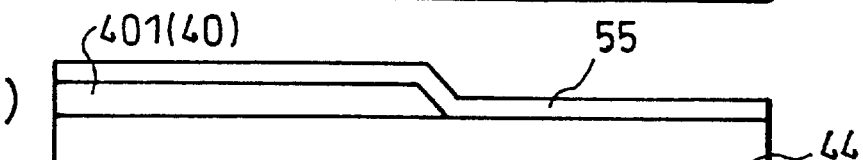
Figure 19:
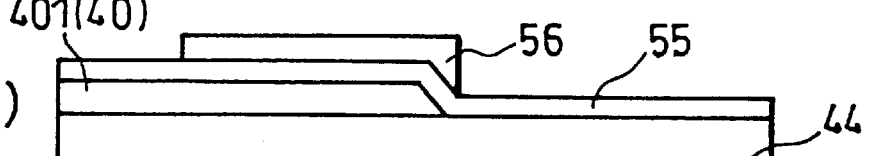
Figure 19:
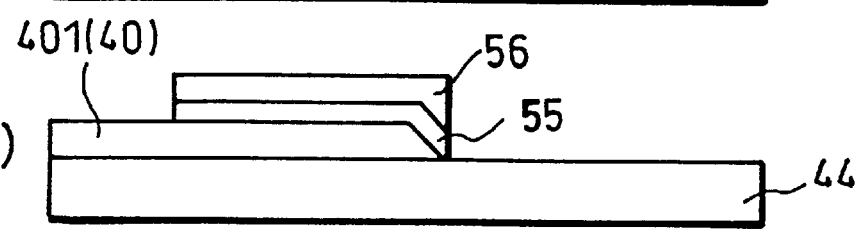
Figure 19:
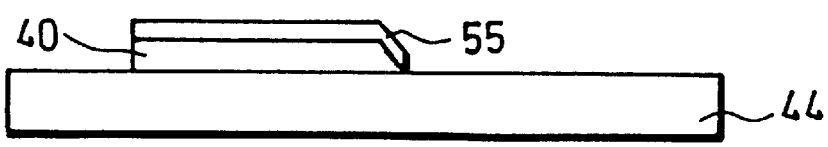

First, as shown in FIG. 19(*a*), an organic insulating film that will serve as an optical waveguide 40, or more specifically, an organic insulating film 401 made of a polyamidimide (Product name Himal, refractive index 1.8; available from Hitachi Chemical Co., Ltd.) having a higher refractive index than a substrate 44 is fabricated with a spincoat technology on the substrate 44 made of a highly translucent quartz.

Subsequently, as shown in FIG. 19(*b*), an organic film 68 such that either the organic film 68 or the organic insulating film 401 can be selectively removed using a solvent, such as photoresist or polystyrene, is fabricated with a spincoat technology on the organic insulating film 401.

Next, as shown in FIG. 19(*c*), a predetermined position of the organic insulating film 401 is irradiated with an excimer laser using the same method of processing as in the preceding embodiment 1, so as to fabricate a tapered surface 54 having an inclination angle of 45°.

Subsequently, as shown in FIG. 19(*d*), the organic film 68 on the organic insulating film 401 is removed by the solvent.

Then, as shown in FIG. 19(*e*), $SiO_2$ that will serve as a clad layer 55 is fabricated with a CVD technique on the substrate 44 and the organic insulating film 401.

Subsequently, as shown in FIG. 19(*f*), a photoresist pattern 56 is fabricated with a photolithography or other technique on a location corresponding to the optical waveguide 40 of the organic insulating film 401.

Subsequently, as shown in FIG. 19(*g*), an $SiO_2$ mask pattern is fabricated from the clad layer 55 on the organic insulating film 401 with an RIE technique, and thereafter, similarly, the optical waveguide 40 shown in FIG. 19(*h*) is fabricated with a RIE technique using the $SiO_2$ mask pattern of the clad layer 55 as a mask.

As a result of the above process, the resultant optical waveguide 40 shows excellent optical properties and has no reaction product sticking to the tapered surface 54.

The polyamidimide used as a material for the optical waveguide 40 has a relatively high heat resistance and allows process temperatures to be raised as high as about 200° C. Further, if the polyamidimide is replaced by polyimide, process temperatures can be increased up to about 350° C.

Next, referring to FIG. 20(*a*) through FIG. 20(*f*), the aforementioned process will be explained in a case where the optical waveguide 40 is to be manufactured with a tapered surface 54 having an inclination angle of 45° on a substrate on a substrate 45 made of silicon.

Figure 20:
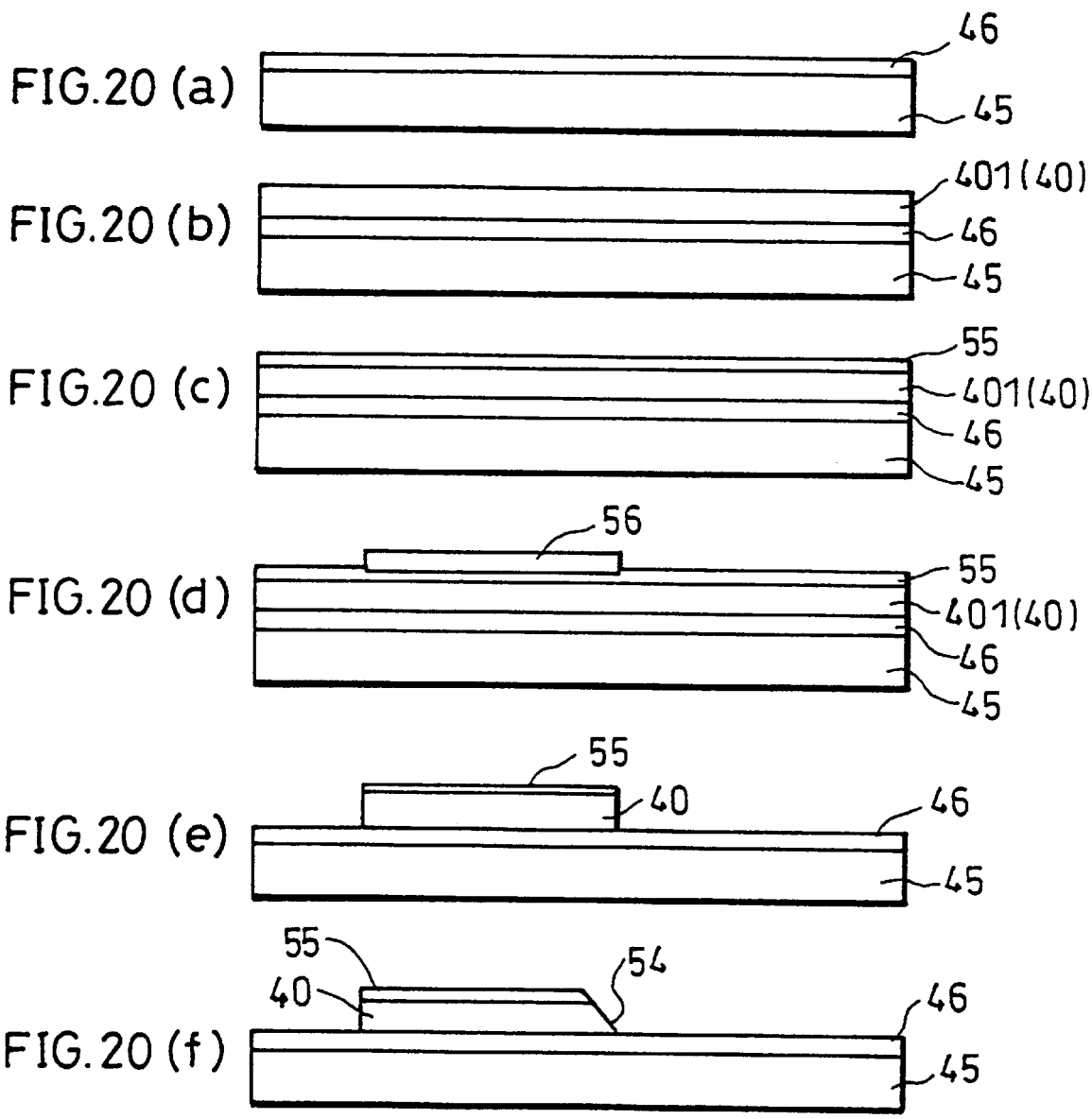
FIGS. 20(a) through 20(f) are explanatory drawings showing another series of processing steps of tapering the end surface of an optical waveguide, which is another application of the method of processing in accordance with the present invention.
Figure 21:
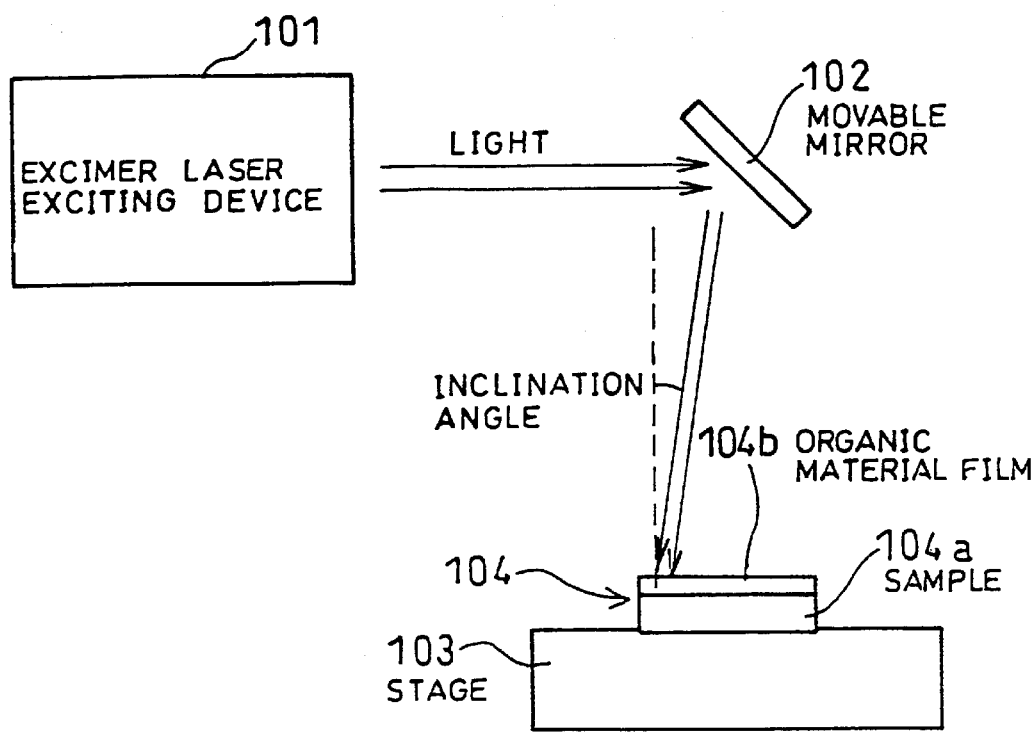
FIG. 21 schematically illustrates an arrangement of a processing device for tapering a conventional target body.
Figure 22:
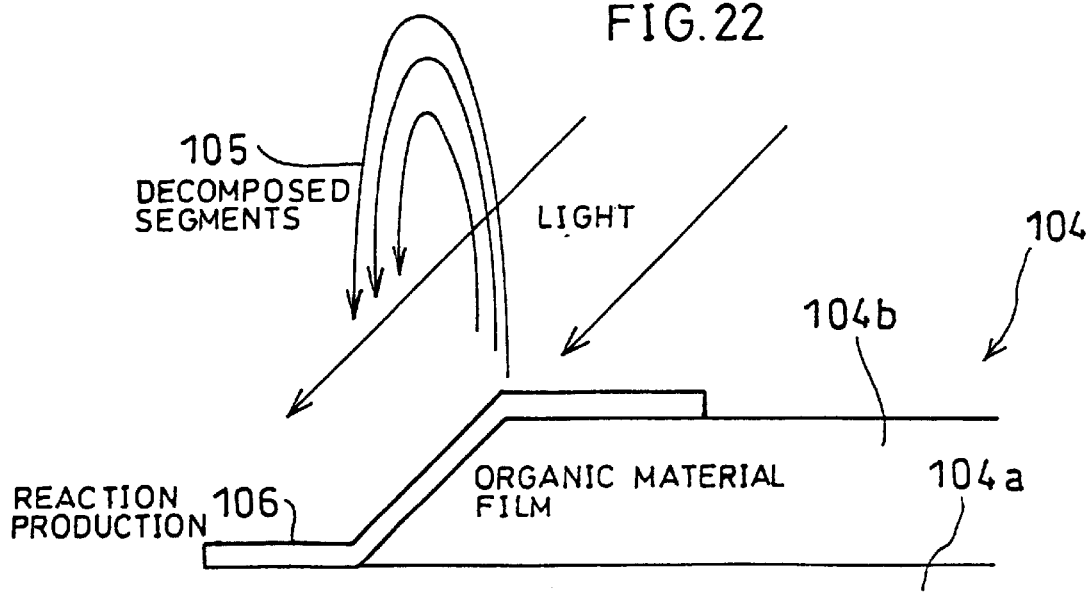
FIG. 22 is an explanatory drawing showing a state during the tapering by means of the processing device shown in FIG. 21.

Fist of all, as shown in FIG. 20(*a*), a buffer layer 46 made of $SiO_2$ having a refractive index of 1.46 is fabricated with a CVD or other technique on a substrate 45 made of silicon.

Subsequently, as shown in FIG. 20(*b*), an organic insulating film 401 made of polyimide having a higher refractive index than $SiO_2$ (PIX, refractive index 1.8; available from Hitachi Chemical Co., Ltd.) is fabricated with a spincoat technology on the buffer layer 46.

Subsequently, as shown in FIG. 20(*c*), a clad layer 55 made of $SiO_2$ is fabricated with a CVD or other technique on the organic insulating film 401.

Subsequently, as shown in FIG. 20(*d*), a photoresist pattern 56 that matches an optical waveguide 40 is fabricated with a photolithography or other technique on the organic insulating film 401.

Subsequently, as shown in FIG. 20(*e*), the optical waveguide 40 is fabricated by etching the organic insulating film 401 using an $SiO_2$ mask pattern fabricated from the clad layer 55 with an RIE technique.

Finally, as shown in FIG. 20(*f*), the tapered surface 54 is fabricated with an inclination angle of 45° by irradiating end surfaces of the optical waveguide 40 and of the clad layer 55 with an excimer laser according to the same method of processing similar as in the aforementioned embodiment 1.

According to this method, when the optical waveguide 40 is processed by irradiation with an excimer laser, although the reaction product sticks outside the tapered surface 54, the $SiO_2$ mask serves as a clad layer 55, and therefore a tapered surface 54 that is free from loss, etc. can be obtained with an inclination angle of 45°. Note that the $SiO_2$ mask composing the clad layer 55 can be removed during the tapering by an excimer laser of an increased irradiation power. Therefore, the tapered surface 54 of the optical waveguide 40 can be fabricated in less steps than required by the method shown in FIG. 19(*a*) through FIG. 19(*h*).

The method of processing in accordance with a first invention disclosed in the present application is, as detailed above, a method of tapering a light-irradiated surface of a target body by irradiating a target body with processing light, and is arranged so that the irradiated region, where the target body is irradiated with the processing light, is set to be larger than the area formed by projecting a tapered part of the target body onto a horizontal plane, and the target body is irradiated with the processing light while moving the target body and the processing light relative to each other.

Therefore, since the irradiated region, where the target body is irradiated with the processing light, is set to be larger than the area formed by projecting a tapered part of the target body onto a horizontal plane, the reaction product produced from the processed target surface is decomposed again gradually by the processing light. This enables the obtained tapered surface to have no sticking reaction product and to be smooth in shape and satisfactory in optical properties.

Further, the method of processing in accordance with a second invention disclosed in the present application is arranged, as detailed above, so that the processing light radiates from a target body end surface direction toward a target body centre direction, and the irradiation with the processing light is terminated before the target body stops moving.

Consequently, since the processing light radiates from a target body end surface direction toward a target body centre direction, and also the irradiation with the processing light is terminated before the target body stops moving, the processed part of the target body is not excessively processed with the processing light, and the obtained tapered surface is smooth and starts at the top of the target body.

Further, the method of processing in accordance with a third invention disclosed in the present application is arranged, as detailed above, so that the irradiation of the target body is started after the target body starts moving.

Consequently, by starting the irradiation of the target body after the target body starts moving, the bed substrate, etc. mounted on the target body can be prevented from being unnecessarily irradiated with the processing light. This can restrain damage to materials other than the target body to low levels.

Further, the method of processing in accordance with a fourth invention disclosed in the present application is arranged, as detailed above, so that the processing light is directed to pass through a shape-modifying-use mask to modify an irradiated region on a target surface into a predetermined shape, and the target body is irradiated with the processing light producing, on the target surface, such an irradiated region that is modified into the predetermined shape.

Consequently, with the processing light being directed to pass through a shape-modifying-use mask to modify an irradiated region on a target surface in-to a predetermined shape, and the target body being irradiated with the processing light producing, on the target surface, such an irradiated region that is modified into a predetermined shape, simply by modifying the mask shape of the shape-modifying-use mask, the shape of the processed part of the target body can be readily modified.

Further, the method of processing in accordance with a fifth invention disclosed in the present application is arranged, as detailed above, so that the shape-modifying-use mask has either a rectangular or trapezoidal shape.

Consequently, with the shape-modifying-use mask having a rectangular mask shape, a rectangular tapered surface having a uniform inclination angle across the tapered surface can be obtained from the processing of the target body. Further, with the shape-modifying-use mask having a trapezoidal mask shape, a substantially V-shaped groove and a reflective surface can be obtained simultaneously from the processing of the target body.

Further, the method of processing in accordance with a sixth invention disclosed in the present application is arranged, as detailed above, so that when the shape-modifying-use mask has a trapezoidal mask shape, the target body is gradually irradiated starting at the front end part side with the processing light producing, on the target surface, such an irradiated region that is modified into a trapezoidal shape, and the irradiation with the processing light is terminated before the processing light reaches a tapered part of the target body.

Consequently, with the target body being subsequently irradiated starting at the front end part side with the processing light producing, on the target surface, such an irradiated region that is modified into a trapezoidal shape, and the irradiation with the processing light being terminated before the processing light reaches a tapered part of the target body, a tapered surface is fabricated where the irradiation with the processing light is terminated. Besides, since the target body continues to be processed with the processing light producing the trapezoidal irradiated region on the target until the processing light reaches a tapered part, the processed part has a substantially V-shaped groove. That is, the substantially V-shaped groove and the tapered surface are simultaneously fabricated from the target body.

Therefore, an optical fibre and other optical waveguide elements are positioned in the substantially V-shaped groove, and the tapered surface, serving as an optical path altering surface, is positioned on an end surface side where light exits the optical waveguide elements. Consequently, compared to separately positioning the position member of the optical waveguide elements and the mirror member that will serve as an optical path altering surface, precision in positioning the optical waveguide element can be greatly improved.

Further, the method of processing in accordance with a seventh invention disclosed in the present application is arranged, as detailed above, so that the processing light is an excimer laser.

Consequently, with the processing light being an excimer laser, the processing amount of the target body can be controlled with high precision, and the target body and other materials can be readily selected for processing.

Further, the method of processing in accordance with an eighth invention disclosed in the present application is arranged, as detailed above, so that the target body is made of an organic polymer.

Consequently, with the target body being an organic polymer, the target body can be easily processed, and becomes more thermally and chemically resistant.

Further, the method of processing in accordance with a ninth invention disclosed in the present application is arranged, as detailed above, so that the target body is fabricated in a film- or plate-like form all across the substrate capable of selectively allowing the processing of the materials composing the target body made of an organic polymer, and thereafter the target body is irradiated with the processing light so as to taper the light-irradiated surface of the target body.

Consequently, with the target body being fabricated in a film- or plate-like form all across the substrate capable of selectively allowing the processing of the materials composing the target body made of the organic polymer, and the target body being thereafter irradiated with the processing light so as to taper a light-irradiated surface of the target body, the tapered surface can be fabricated readily and quickly. Therefore, large numbers of the target bodies can be processed.

Further, the method of processing in accordance with a tenth invention disclosed in the present application is arranged, as detailed above, so that the target body is fabricated in an isolated manner on the substrate capable of selectively allowing the processing of the materials composing the target body made of an organic polymer, and thereafter the target body is irradiated with the processing light so as to taper the light-irradiated surface of the target body.

Consequently, with the target body being fabricated in an isolated manner on the substrate capable of selectively allowing the processing of the materials composing the target body made of the organic polymer, and the target body being thereafter irradiated with the processing light so as to taper a light-irradiated surface of the target body, the method of processing can better handle the sticking of the reaction product that is produced during the process.

Further, the method of processing in accordance with an eleventh invention disclosed in the present application is, as detailed above, a method of processing the light-irradiated surface of the target body by irradiating the target body with the processing light, and is arranged so that the irradiated region, where the target body is irradiated with the processing light, is set to be larger than the area formed by projecting a target part of the target body onto a horizontal plane, and the target body is irradiated with the processing light while moving the target body and the processing light relative to each other.

Consequently, by setting the irradiated region, where the target body is irradiated with the processing light, to be larger than the area formed by projecting a processed target part of the target body onto a horizontal plane, and irradiating the target body with the processing light while moving the target body and the processing light relative to each other, the target body can be gradually processed starting at a target end surface thereof. As a result, the part of the target body irradiated with the processing light will become a processed target surface. Here, altering the relative velocity of the target body to the processing light or the magnitude of the irradiation energy of the processing light during the process readily permits changes in the shape of the processed target surface.

Besides, since the irradiated region, where the target body is irradiated with the processing light, is set to be larger than the area formed by projecting a processed target part of the target body onto a horizontal plane, the reaction product produced from the processed target surface is decomposed again gradually by the processing light. This enables the obtained tapered surface to have no sticking reaction product and to be smooth in shape and satisfactory in optical properties.

Further, the optical component in accordance with a twelfth invention disclosed in the present application is arranged, as detailed above, so that it includes an optical element having a surface that is tapered according to the method of processing in accordance with any one of the first to tenth inventions so as to serve as an optical path altering surface.

Consequently, since the optical element has a tapered surface processed according to the method of processing in accordance with any one of the first to tenth inventions that serves as an optical path altering surface, the use of the optical component would facilitate the manufacture of small lenses and prisms between 0.1 mm and about 2 to 3 mm in diameter, and micro-optical components such as beam splitters.

Further, the optical component in accordance with a thirteenth invention disclosed in the present application is arranged, as detailed above, so that the optical element is an optical waveguide element, and the tapered surface is an end surface of an optical waveguide element.

Consequently, by using the optical component, optical integrated circuits, such as semiconductor lasers and optical modulators, can be readily manufactured.

Further, the optical component in accordance with a fourteenth invention disclosed in the present application is arranged, as detailed above, so that a metallic film is fabricated on the tapered surface.

Consequently, with a metallic film being fabricated on the tapered surface, light can alter its optical path on the tapered surface with higher efficiency.

Further, the optical component in accordance with a fifteenth invention disclosed in the present application is arranged, as detailed above, so that a dielectric film having a refractive index lower than that of a core of the optical waveguide element is fabricated on the tapered surface of the optical waveguide element, and a light blocking film having a high reflectance is formed on the dielectric film.

Consequently, with a dielectric film having a refractive index lower than that of the core of the optical waveguide element being fabricated on the tapered surface of the optical waveguide element, and a light blocking film having a high reflectance being formed on the dielectric film, light can alter its optical path on the tapered surface with higher efficiency, and the sticking of foreign bodies can be better handled.

Further, the optical component in accordance with a sixteenth invention disclosed in the present application is arranged, as detailed above, so that an optical multilayer film having a high reflectance is formed on the tapered surface of the optical element.

Consequently, with an optical multilayer film having a high reflectance being formed on the tapered surface of the optical element, light can alter its optical path on the tapered surface with higher efficiency.

Further, the optical component in accordance with a seventeenth invention disclosed in the present application is arranged, as detailed above, so that the tapered surface has a tapered angle of substantially 45°.

Consequently, with the tapered angle of the tapered surface being substantially 45°, light can alter its optical path with higher reflection.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical component, including an optical element having a surface that is tapered, so as to serve as an optical path altering surface, by setting an irradiated region, where a target body is irradiated with processing light and where the processing light is directed to an end of the target body, to be larger than an area formed by projecting a tapered part of the target body onto a horizontal plane, and irradiating the target body with the processing light while moving the target body and the processing light relative to each other, wherein a moveable end part of the processing light is made to coincide with an end part of the tapered part.

2. The optical component as defined in claim 1,
   wherein the optical element is an optical waveguide element, and the tapered surface is an end surface of the optical waveguide element.

3. The optical component as defined in claim 1, wherein a metallic film is fabricated on the tapered, surface of the optical waveguide element.

4. The optical component as defined in claim 2,
   wherein a dielectric film having a refractive index lower than that of a core of the optical waveguide element is fabricated on the tapered surface of the optical waveguide element, and a light blocking film having a high reflectance is formed on the dielectric film.

5. The optical component as defined in claim 3,
   wherein an optical multilayer film having a high reflectance is formed on the tapered surface of the optical element.

6. The optical component as defined in claim 1,
   wherein the tapered surface has a tapered angle of substantially 45°.

* * * * *